US012629806B2

(12) United States Patent
Hegarty et al.

(10) Patent No.: US 12,629,806 B2
(45) Date of Patent: May 19, 2026

(54) FASTENER TOOL WITH CONTINUOUSLY POWERED FLYWHEEL

(71) Applicant: BLACK & DECKER, INC., New Britain, CT (US)

(72) Inventors: Daniel Hegarty, Baltimore, MD (US); Jongsoo Lim, Timonium, MD (US)

(73) Assignee: BLACK & DECKER, INC., New Britain, CT (US)

( * ) Notice: Subject to any disclaimer, the term of this patent is extended or adjusted under 35 U.S.C. 154(b) by 33 days.

(21) Appl. No.: 18/465,295

(22) Filed: Sep. 12, 2023

(65) Prior Publication Data

US 2025/0083291 A1 Mar. 13, 2025

(51) Int. Cl.
*B25C 1/06* (2006.01)
*B25C 1/00* (2006.01)

(52) U.S. Cl.
CPC ................ *B25C 1/06* (2013.01); *B25C 1/003* (2013.01)

(58) Field of Classification Search
CPC .................................. B25C 1/06; B25C 1/003
See application file for complete search history.

(56) References Cited

U.S. PATENT DOCUMENTS 4,121,745 A 10/1978 Smith et al.
4,129,240 A 12/1978 Geist
4,189,080 A 2/1980 Smith et al.
4,298,072 A 11/1981 Baker et al.
4,323,127 A 4/1982 Cunningham
4,530,454 A 7/1985 Gloor et al.
4,721,170 A * 1/1988 Rees ......................... B25C 1/06 173/124
4,928,868 A 5/1990 Kerrigan
4,964,558 A 10/1990 Crutcher et al.
5,098,004 A 3/1992 Kerrigan
5,320,270 A 6/1994 Crutcher
5,495,161 A 2/1996 Hunter
5,511,715 A 4/1996 Crutcher et al.
7,325,711 B2 2/2008 Schiest et al.
7,410,085 B2 8/2008 Wolf et al.
7,494,036 B2 2/2009 Shima et al.
7,500,589 B2 3/2009 Wolf et al.
7,575,141 B1 * 8/2009 Liang ........................ B25C 1/06 173/205
7,575,142 B2 8/2009 Liang et al.
7,789,281 B2 9/2010 Tanimoto et al.
7,866,521 B2 1/2011 Gross et al.
(Continued)

*Primary Examiner* — Lucas E. A. Palmer
(74) *Attorney, Agent, or Firm* — Pillsbury Winthrop Shaw Pittman, LLP

(57) ABSTRACT

A fastener tool that drives a fastener into a workpiece includes a housing, a driver, a motor, a flywheel, an actuator, and a controller. The motor is configured to be in either its energized state or its deenergized state. The actuator is configured to move the driver into engagement with the flywheel. The controller is operatively connected to the motor and the actuator to implement a firing sequence for driving the fastener in the drive channel into the workpiece. The controller is configured to i) control the actuator to initiate a drive engagement between the driver and the flywheel, and ii) control the motor to remain in its energized state while the flywheel is in the drive engagement with the driver transmitting the energy from the flywheel to the driver so as to move the driver along the drive axis.

20 Claims, 11 Drawing Sheets

(56) References Cited

U.S. PATENT DOCUMENTS

| | | | | |
|---|---|---|---|---|
| 8,132,702 | B2 | 3/2012 | Kunz et al. | |
| 8,162,073 | B2 | 4/2012 | Krondorfer et al. | |
| 8,302,833 | B2 | 11/2012 | Gross et al. | |
| 8,534,527 | B2 | 9/2013 | Brendel et al. | |
| 8,550,323 | B2 | 10/2013 | Fujimoto | |
| 8,939,342 | B2 | 1/2015 | Brendel et al. | |
| 9,399,281 | B2 | 7/2016 | Brendel et al. | |
| 9,744,657 | B2 | 8/2017 | Baron et al. | |
| 9,827,658 | B2 | 11/2017 | Gregory et al. | |
| 10,022,848 | B2 * | 7/2018 | Gross | B25F 5/00 |
| 10,693,344 | B2 | 6/2020 | Purohit et al. | |
| 10,926,385 | B2 | 2/2021 | Myers et al. | |
| 10,987,790 | B2 * | 4/2021 | Garber | B25C 1/008 |
| 11,279,013 | B2 * | 3/2022 | Jaskot | B25C 1/008 |
| 11,325,233 | B2 * | 5/2022 | Akiba | B25C 1/06 |
| 2005/0217416 | A1 * | 10/2005 | Berry | B25C 1/06 29/527.3 |
| 2005/0217874 | A1 * | 10/2005 | Forster | B25F 5/00 173/1 |
| 2005/0217875 | A1 * | 10/2005 | Forster | B25C 1/06 173/1 |
| 2005/0218178 | A1 * | 10/2005 | Berry | B25C 1/06 227/8 |
| 2005/0218180 | A1 * | 10/2005 | Gross | B25C 1/06 173/210 |
| 2008/0067213 | A1 * | 3/2008 | Shima | B25C 1/06 227/129 |
| 2008/0257933 | A1 * | 10/2008 | Takahashi | B25C 1/06 227/129 |
| 2009/0032567 | A1 * | 2/2009 | Liang | B25C 1/06 227/131 |
| 2010/0065294 | A1 * | 3/2010 | Hirabayashi | B25C 1/06 173/122 |
| 2011/0094847 | A1 * | 4/2011 | Hirabayashi | B25C 1/06 192/105 R |
| 2012/0325887 | A1 | 12/2012 | Wolf | |
| 2014/0076951 | A1 * | 3/2014 | Brendel | B25C 1/06 227/8 |
| 2014/0076952 | A1 * | 3/2014 | Garber | B25C 1/06 227/129 |
| 2014/0088753 | A1 * | 3/2014 | Lim | B25F 5/021 700/168 |
| 2014/0097223 | A1 * | 4/2014 | Baron | B25C 1/06 227/129 |
| 2016/0207185 | A1 * | 7/2016 | Garber | B25C 1/008 |
| 2018/0015600 | A1 * | 1/2018 | Akiba | B25C 1/06 |
| 2019/0321956 | A1 * | 10/2019 | Baskar | B25C 1/008 |
| 2019/0366527 | A1 * | 12/2019 | Akiba | B25C 5/15 |
| 2020/0039044 | A1 * | 2/2020 | Akiba | B25C 1/06 |
| 2020/0306941 | A1 * | 10/2020 | Akiba | B25C 1/04 |
| 2021/0021215 | A1 | 1/2021 | Tsai et al. | |
| 2022/0040836 | A1 * | 2/2022 | Chien | B25C 1/06 |
| 2022/0161404 | A1 | 5/2022 | Lim et al. | |
| 2024/0261950 | A1 * | 8/2024 | Hegarty | B25C 1/06 |
| 2025/0050485 | A1 * | 2/2025 | Liang | H01F 7/20 |

* cited by examiner

FASTENER TOOL WITH CONTINUOUSLY POWERED FLYWHEEL

FIELD

The patent application relates, in general, to the field of power tools. In particular, this patent application relates to portable fastening or driving tools, such as nailers and staplers.

BACKGROUND

Fastener devices/tools, such as nailers and staplers, are relatively commonplace in the construction trades. Several types of the nailers have been introduced to the market in an effort to satisfy the demands of modern consumers. Some of the nailers use a spring-loaded device to push fasteners into position such that a drive mechanism or driver may then be actuated to fire or push a fastener into a workpiece.

The fastener device/tool may typically include a drum for storing a coil of collated fasteners and a feed mechanism or feeder configured to feed the fasteners into a nosepiece/nose assembly of the fastener tool. These fastener tools are known in the art for attaching a series or a succession of nails or fasteners into workpieces. The fastener tools can be electric, battery or pneumatic powered. The fastener tool can engage a transmission and a motor to drive a fastener/nail/staple into the workpiece.

Some fastener tools may include a flywheel to enable translation/movement of the driver. The driver is selectively drivingly engaged with the flywheel via operation of a power take-off ("PTO") assembly. When actuated, the PTO assembly is configured to move the driver laterally relative to the axis of the fastener tool, to thereby selectively engage, press or squeeze the driver against an outer circumference of the flywheel. The flywheel is only powered during a small portion of the PTO activation/nail firing event.

U.S. Pat. No. 8,162,073 ("the '073 Patent"), which is herein incorporated by reference in its entirety, discloses a fastener tool and a method of impacting a fastener. The method includes energizing a motor; rotating a housing of the motor; deenergizing the motor; engaging the rotating housing of the motor and a drive mechanism after deenergizing the motor; and transferring energy from the rotating housing of the motor to the drive mechanism with the rotating housing of the motor engaged with the drive mechanism and the motor deenergized.

FIG. 10 shows current draw from a battery of a prior art fastener tool (e.g., one shown in the '073 Patent) during the nail firing event. Referring to FIG. 10, an initial increase in power draw IIPD is due to the flywheel ramping up to the desired RPM/speed. Once the flywheel has reached desired speed, the flywheel is no longer powered (i.e., the motor is not active). The spike S is due to the activation of the PTO. The dashed lines $A_1$ and $A_2$ designate the time between single nail firing events. For example, as shown in FIG. 10, the time between the single nail firing event may be 510 milliseconds (ms).

FIG. 11 shows a flow chart of a method of operation of the prior art fastener tool (e.g., one shown in the '073 Patent). Operation of the fastener tool may include an operator or user positioning the nosepiece assembly in position on the workpiece. As the operator places bias on the fastener tool towards the workpiece, a contact trip assembly is moved or actuated, placing the fastener tool in an active state, waiting for a trigger to be pulled or depressed. A control module or controller of the fastener tool 10 may send a signal to the motor to energize the motor after the contact trip switch is tripped.

At procedures 1102 and 1104, a nail firing event starts and the motor is energized (i.e., activate power to the motor). At procedure 1106, the motor is de-energized (i.e., deactivate power to the motor). At procedure 1108, a first time delay/period $T_1$ is implemented after de-energizing the motor and providing a pulse PTO (e.g., a current of 20 A) to the drive actuator. For example, at procedure 1110, providing the pulse PTO to the drive actuator activates the drive actuator. When the trigger is pulled by the operator, the trigger switch is closed, initiating the control module to activate the drive actuator, and thus drive a fastener. Accordingly, the driver drives the lead fastener into the workpiece. Power to the motor is deactivated during the signals (electric pulses) to the drive actuator, which may be before or shortly after procedure 1100. At procedure 1112, a second time delay $T_2$ is implemented after activating the drive actuator and before deactivating the drive actuator. The second time delay $T_2$ may define the time of activation of the drive actuator. At procedure 1114, the drive actuator is deactivated. The drive actuator is deactivated by the controller after the fastener is driven into the workpiece. At procedure 1116, a third time delay $T_3$ is implemented after deactivating the drive actuator and before energizing the motor. The motor may receive power after the deactivation of the drive actuator, during the time delay $T_3$. At procedure 1118, the motor is energized (i.e., activate power to the motor).

The present patent application provides improvements in the fastener tools.

SUMMARY

One aspect of the present patent application provides a fastener tool that drives a fastener into a workpiece. The fastener tool comprises a housing, a nose assembly, a driver, a motor, a flywheel, an actuator, and a controller. The nose assembly is connected with the housing. The nose assembly has a drive channel into which the fastener to be driven into the workpiece is fed. The drive channel having a drive axis. The driver is configured to be movable along the drive axis to engage and drive the fastener in the drive channel into the workpiece. The motor is disposed in the housing. The motor is configured to be in either its energized state or its deenergized state. The flywheel is disposed in the housing. The flywheel is configured to be driven by the motor and configured to transmit energy to the driver to cause the driver to move along the drive axis. The actuator is configured to move the driver into engagement with the flywheel such that energy is transferred from the flywheel to the driver. The controller has one or more processors. The controller is operatively connected to the motor and the actuator to implement a firing sequence for driving the fastener in the drive channel into the workpiece. The controller is configured to i) control the actuator to initiate a drive engagement between the driver and the flywheel, and ii) control the motor to remain in its energized state while the flywheel is in the drive engagement with the driver transmitting the energy from the flywheel to the driver so as to move the driver along the drive axis.

Implementations of the foregoing aspects may include one or more of the following features.

The actuator may be a drive actuator. The drive actuator may include a drive solenoid.

The actuator may be a drive actuator. The drive actuator may include an electromechanical device.

The fastener tool may further comprise a feed actuator and a feeder. The controller may be operatively connected to the feed actuator to implement the firing sequence for driving a lead fastener into the workpiece using the driver and for feeding the lead fastener into the nose assembly using the feeder. The feed actuator may be configured to move the lead fastener into the nose assembly. The firing sequence may include a first electric pulse to the drive actuator and a second electric pulse to the feed actuator.

The feed actuator may include a feed solenoid.

The controller may be configured to control the motor to continuously supply power to the flywheel during the firing sequence.

The fastener tool may further comprise an arm and a roller, the arm being spring biased by a spring towards a first position. The drive actuator may be configured to press against the spring to move the arm into a second position such that the arm moves the roller to push the driver into engagement with the flywheel to cause the movement of the driver along the drive axis.

The fastener tool may further comprise a biasing spring and a feed rod that is configured to move the lead fastener into the nose assembly. The biasing spring may be configured to bias the feed rod into a first position. The feed actuator may be configured to move the feed rod to a second position, against a biasing force of the biasing spring, for moving the lead fastener into the nose assembly.

The fastener tool may further comprise a magazine coupled to the nose assembly and disposed in the housing. The magazine may be configured to carry a supply of fasteners through a feed channel along a feed channel direction toward the nose assembly. The feeder may be operatively connected with the magazine and may be configured to advance the fastener in a feed direction through the magazine and into the drive channel prior to driving the fastener into the workpiece.

The drive actuator may be positioned on a first axis. The feed actuator may be positioned on a second axis. The first axis and the second axis may be positioned at a non-perpendicular angle relative to one another.

The first axis may be parallel to the drive axis, and the second axis may be parallel to the feed direction.

The drive axis of the drive actuator is provided in a first plane and an axis of the feed actuator defining the feed direction is provided in a second plane. The first plane is different from the second plane.

The controller may be configured to control a supply of power from a power source to the motor to initiate a drive cycle. The drive cycle may include a time from which the driver is activated to engage and drive the fastener in the drive channel into the workpiece to a time until the driver is retracted along the drive axis to clear the drive channel and to allow for feeding of a subsequent fastener into the drive channel.

The feed actuator may include an electromechanical device.

The firing sequence includes a drive event for driving a lead fastener into the workpiece using the driver. The motor may be configured to be energized for entirety of the drive event, and the motor may be configured to be energized after the drive event, even after the actuator is de-energized and the driver has disengaged from the flywheel. While the motor is still energized after the drive event, the driver is configured to reset to its home position to be ready for the next drive event.

Another aspect of the present patent application provides a method for operating a fastener tool (described in detail according to the above embodiment). The method comprises i) controlling the motor to be in its energized state before implementing the firing sequence and before controlling the actuator; and ii) controlling the actuator to initiate the drive engagement between the flywheel and the driver to transmit energy from the flywheel to the driver so as to move the driver along the drive axis while the motor is still in its energized state.

A fastener tool that drives a fastener into a workpiece includes a housing, a nose assembly connected with the housing, a motor, a feeder, a feed actuator, and a controller. The nose assembly includes a drive channel into which the fastener to be driven into the workpiece is fed. The drive channel includes a drive axis. The motor is disposed in the housing. The motor is configured to be in either its energized state or its deenergized state. The feeder is configured to feed a lead fastener into the nose assembly. The feed actuator is configured to move the lead fastener into the nose assembly. The controller includes one or more processors. The controller is operatively connected to the motor and the feed actuator to implement a firing sequence for feeding the lead fastener into the nose assembly. The controller is configured to: control the feed actuator to facilitate movement of the lead fastener into the nose assembly, and control the motor to remain in its energized state while the feed actuator moves the lead fastener into the nose assembly.

The feed actuator may include an electromechanical device.

The feed actuator may include a feed solenoid.

The fastener tool may further comprise a driver, a flywheel, and a drive actuator. The driver may be configured to be movable along the drive axis to engage and drive the fastener in the drive channel into the workpiece. The flywheel may be disposed in the housing and may be configured to be driven by the motor. The flywheel may be configured to transmit energy to the driver to cause the driver to move along the drive axis. The drive actuator may be configured to move the driver into engagement with the flywheel such that energy is transferred from the flywheel to the driver. The controller may be operatively connected to the motor and the drive actuator to implement the firing sequence for driving the fastener in the drive channel into the workpiece. The firing sequence may include a first electric pulse to the drive actuator for driving the fastener in the drive channel into the workpiece and a second electric pulse to the feed actuator for feeding the lead fastener into the nose assembly.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of “a”, “an”, and “the” include plural referents unless the context clearly dictates otherwise.

Other aspects, features, and advantages of the present patent application will become apparent from the following detailed description, the accompanying drawings, and the appended claims.

DETAILED DESCRIPTION

Figure 1:
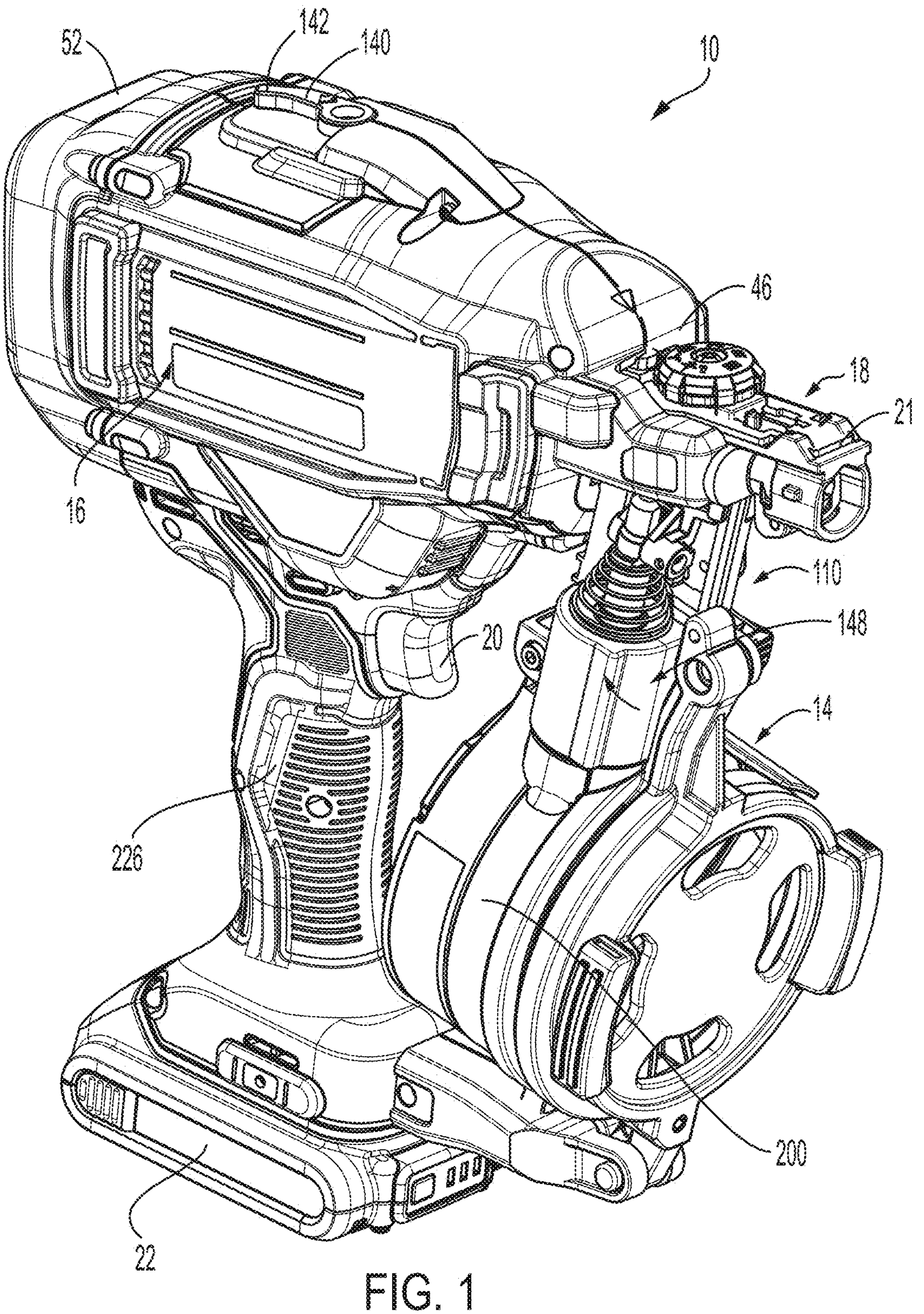
FIG. 1 shows a perspective view of an exemplary fastener tool in accordance with an embodiment of the present patent application.

In one embodiment of the present patent application, referring to FIGS. 1-6, a fastener tool 10 that drives a fastener (not shown) into a workpiece (not shown). The fastener tool 10 comprises a housing 16, a nose assembly 18, a driver 26, a motor 32, a flywheel 34, an actuator 36, and a controller 38. The nose assembly 18 is connected with the housing 16. The nose assembly 18 has a drive channel DC into which the fastener to be driven into the workpiece is fed. The drive channel DC having a drive axis 29. The driver 26, the motor 32, the flywheel 34, the controller 38, the drive channel DC and the drive axis 29 are clearly shown in FIG. 4. The driver 26 is configured to be movable along the drive axis 29 to engage and drive the fastener in the drive channel DC into the workpiece. The motor 32 and the flywheel 34 are disposed in the housing 16. The motor 32 is configured to be in either its energized state or its deenergized state. The flywheel 34 is configured to be driven by the motor 32 and is configured to transmit energy to the driver 26 to cause the driver 26 to move along the drive axis 29. The actuator 36 is configured to move the driver 26 into engagement with the flywheel 34 such that energy is transferred from the flywheel 34 to the driver 26. The controller 38 has one or more processors P. The controller 38 is operatively connected to the motor 32 and the actuator 36 to implement a firing sequence for driving the fastener in the drive channel DC into the workpiece. The controller 38 is configured to i) control the actuator 36 to initiate a drive engagement between the driver 26 and the flywheel 34, and ii) control the motor 32 to remain in its energized state while the flywheel 34 is in the drive engagement with the driver 26 transmitting the energy from the flywheel 34 to the driver 26 so as to move the driver 26 along the drive axis 29.

This patent application relates to corded or cordless, portable fastener driving tools, such as a nailers and staplers, and improvements made therein for driving capabilities of the fastener tool 10.

The fastener tool 10 may be interchangeably referred to as a fastener driver, a fastener device, a fastener driving tool, a fastener driving device, a nail gun, a stapler gun, a nailer, a device, or a tool that is adapted to drive fastener(s) into the workpiece. The fasteners may be staples, U-shaped staples, brads, nails, fasteners, and the like. The fastener and the nail may be used interchangeably herein. In one embodiment, the fasteners may be collated. The fastener tool 10 may be a cordless power tool, in accordance with an embodiment. In one embodiment, the fastener tool 10 is a nailer or a nail gun configured to drive nail(s) into the workpiece.

This patent application includes the fastener tool 10 that is configured to continuously supply power to the flywheel 34 during entire PTO activation/nail firing event. The result is shorter time between shots. This patent application may be configured to decrease time to next shot (TTNS). This patent application provides a software control of the fastener tool 10 with the flywheel 34 that is continually powered throughout a drive cycle. The fastener tool 10 may include an outer rotor motor flywheel (motor/flywheel combination) and the software controls for the driving of the motor 32 and thus, the flywheel 34. The software controls the motor 32 and hence the flywheel 34 to be continually powered throughout the drive cycle.

The housing 16 may be formed from molded parts. In one embodiment, a first side part and a second side part of the housing 16 may be molded and joined together to encapsulate parts of a driving/drive mechanism and a feed mechanism (described in greater detail below) of the fastener tool 10 within the housing 16. The drive/driving mechanism may be interchangeably referred to as the driver or the driver assembly and the feed/feeder mechanism may interchangeably referred to as the feeder 110 or feed/feeder assembly. The housing 16 may be made of extruded or molded plastic material, for example. The housing 16 may be formed from an Acrylonitrile Butadiene Styrene (ABS) plastic material. These examples materials of the housing 16 should not be limiting. Other materials, such as polycarbonates and/or combinations of materials, may also be used to form the housing 16. The housing 16 has a front end 46 and a back end 52. The housing 16 may include a handle 226 that is adapted to be gripped by the hand of an operator or a user. In one embodiment, the handle 226 is configured to extend between a top end and a bottom end of the housing 16. The housing 16 may also conventionally house a trigger 20 and the motor 32 with the driver 26, which may be selectively translated along the drive axis 29 to drive the fastener into the workpiece. Further details of the housing 16 are provided in commonly assigned U.S. Pat. No. 7,866,521 ("the '521 Patent") and U.S. Patent Application Publication No.: 2022/0161404 ("the '404 Patent Application"), each of which are commonly assigned and are incorporated by reference in their entirety.

The nose assembly 18 may extend from the housing 16 proximate the magazine 14 (described in detail below) and may be conventionally configured to engage the magazine 14 so as to sequentially receive fasteners therefrom. The nose assembly 18 may also serve in a conventional manner to guide the driver 26 and fastener when the fastener tool 10 has been actuated to install/drive the fastener into the workpiece. The nose assembly 18 may be interchangeably referred to as nosepiece or nosepiece assembly, and the magazine 14 may be interchangeably referred to as magazine assembly.

The nose assembly 18 may further include a contact trip assembly 21, which is described in detail below. In addition to the contact trip assembly 21, the nose assembly 18 may include a barrel 66 that forms a part of the drive channel DC for the driver 26 to move within an interior portion thereof and drive a fastener. The nose assembly 18 of the fastener tool 10 may include one, some, or all features as described in U.S. Pat. No. 9,827,658 ("the '658 Patent") and/or U.S. Pat. No. 10,926,385 ("the '385 Patent"), both of which are commonly assigned and are incorporated by reference herein in their entireties.

The driver 26 includes a driver blade at one end thereof. The driver 26 may be configured for translational movement within the drive channel DC along the drive axis 29. The driver 26 may also be configured to engage with and drive the lead fastener in the drive channel DC into a workpiece. The driver 26 may be made of any number of materials, including, but not limited to, aluminum, nickel, steel, stainless steel, and/or combinations thereof.

The driver 26 may include a drive cycle/sequence/stroke. The drive cycle may include a time from which the driver 26 is activated to engage and drive the fastener in the drive channel DC into the workpiece to a time until the driver 26 is retracted along the drive axis 29 to clear the drive channel DC and to allow for feeding of a subsequent fastener (e.g., by the feed mechanism/assembly) into the drive channel DC. That is, the nail/fastener driving/drive cycle may include time from the activation of the driver mechanism until the driver has partially returned far enough to allow feeding of the next/subsequent nail/fastener (i.e., the drive path/channel DC is cleared).

A drive system 19, associated with the drive actuator 36, is configured to selectively drive the driver 26 along the drive axis 29 (or path), to drive the nail or fastener into a workpiece. The drive system 19 (also interchangeably referred to herein as a drive motor assembly), may include the power source 25, the driver 26, an activation arm assembly 28, and a return mechanism 30. The activation arm assembly 28 of the drive system 16 may include has at least one arm and at least one roller for moving the driver 26. The arm may be spring biased by a spring towards a first position, and the drive actuator 36 may be configured to initiate movement of corresponding parts within the fastener tool 10, to thereby press against the spring-bias and move the arm into a second position. As the arm moves, the roller(s) move to press against and push the driver 26 into engagement with the flywheel 34 to cause the movement of the driver 26 along the drive axis 29.

The activation arm assembly 28 may include the drive actuator 36, a carriage 44 (may include a pair of arm members 56 that can be spaced laterally apart, one on each side of the fastener tool 10), a roller assembly carrier, a follower arm 48, a roller assembly 40 (that includes a first roller 42 and a second roller 50), and a biasing mechanism 54. The activation arm assembly 28 and the return mechanism 30 are described in detail in the incorporated '404 Patent Application and, therefore, they will not be described in detail here.

In one embodiment, the energy/power source/assembly includes the motor 32, the flywheel 34, and the drive actuator 36. In one embodiment, the motor 32 is an outer rotor brushless motor, wherein the rotor is provided on an outside and the stator is provided on an inside thereof. The flywheel 34 may be coupled to an output shaft of the motor 32. The motor 32 may be operable for rotating the flywheel 34, for example, via a motor pulley, a belt and a flywheel pulley. The outer rotor of the motor 32 may be integrally formed with the flywheel 34.

The flywheel 34 may be driven by the motor 32. The flywheel 34 may be configured to transmit the power to the driver 26 to thereby cause the driver 26 to translate in the drive channel DC and along the drive axis 29.

U.S. Pat. No. 9,399,281 ("the '281 Patent") and U.S. Pat. No. 8,302,833 ("the '833 Patent"), both of which are commonly assigned and are incorporated by reference herein in their entireties, disclose power take-off (PTO) assemblies of cordless electric powered nailers. For example, as disclosed in the '833 Patent, the PTO assembly is positioned to selectively engage a nail driver against a flywheel.

The driver 26 is selectively drivingly engaged with the flywheel 34 via operation of the PTO assembly (e.g., located on the opposite side of the driver 26, relative to the motor 32). When actuated, the PTO assembly is configured to move the driver 26 laterally relative to the axis of the fastener tool 10, to thereby selectively engage, press or squeeze the driver 26 against the outer circumference of the flywheel 34. In general, the PTO assembly may include a pinch roller, a linkage member or arm, the drive solenoid and a compression spring assembly. Actuation of the PTO assembly may be achieved by energizing the drive solenoid 36/92 via a control signal from the controller 38. When energized, the drive solenoid 36/92 retracts the linkage arm, causing the pinch roller to move laterally and engage the driver 26. The compression spring assembly serves to apply a predetermined compression force on the pinch roller to insure that the driver 26 is tightly "pinched" against the outer circumferential surface of the flywheel 34. This action facilitates the efficient transfer of stored energy from the rotating flywheel 34 to the driver 26.

The fastener tool 10 may include one or more sensors S that are operatively connected to the flywheel 34, the motor 32, or both. The one or more sensors S is configured to measure and output at least (a) a signal indicative of a characteristic of the flywheel 34 or (b) a signal indicative of a characteristic of the motor 32. The one or more sensors S is also operatively connected to the controller 38.

The one or more sensors S may include a sensor that is configured to sense the speed, angular velocity, etc. of the flywheel 34. The one or more sensors S may be configured to measure and output a signal indicative of a characteristic (e.g., a Pulse Width Modulation (PWM), current supplied to the motor, etc.) of the motor 32. As a person of ordinary skill in the art would appreciate from this patent application, the sensor S may sense the characteristic directly or indirectly. For example, the speed of the output shaft of the motor 32 or the speed of the flywheel 34 may be sensed directly, as through encoders, position detector(s), mechanical sensor(s), optical sensor(s), variable reluctance sensor(s), inductive proximity sensor(s), eddy current sensors or Hall effect sensors, or indirectly, as through the back electromotive force of the motor 32.

The controller 38 may include one or more processors P. The controller 38 and circuitry may be provided at the back end 52 of the housing 16. The controller 38 may be provided in the form of a microprocessor and one or more circuit boards, for example, including relay module and one or more MOSFETs. The controller or control circuit 38 may include a microcontroller that is electrically connected to receive input signals from a plurality of switches/sensors, including the trigger switch TS, a contact trip switch CTS, a mode selector switch and/or a fastener size selector switch. The trigger switch TS may be an ON/OFF switch that controls the application of power from the battery pack to the controller 38, which in turn controls the application of power to the motor 32/flywheel 34.

The controller 38 is operatively connected to and/or to communicate the motor 32 and the actuator 36 to implement a firing sequence for driving the fastener in the drive channel DC into the workpiece. The controller is configured to i) control the actuator 36 to initiate a drive engagement between the driver 26 and the flywheel 34, and ii) control the motor 32 to remain in its energized state while the flywheel 34 is in the drive engagement with the driver 26 transmitting the energy from the flywheel 34 to the driver 26 so as to move the driver 26 along the drive axis 29.

The controller 38 may be programmed to provide power and/or control signals (e.g., electric pulses) over control lines to the drive actuator 36 and a feed actuator 148. That is, the drive actuator 36 and the feed actuator 148 are connected to the controller 38 via control lines. The controller 38 may be configured to operate both the driver 26 and the feeder 110. In one embodiment, the controller 38 may only be configured to operate the driver 26.

The controller 38 may be configured to receive input from the trigger 20, which affects movement of the driver 26 and feed rod to load fasteners in the nose assembly 18 of the fastener tool 10. Upon receiving a signal from the trigger switch TS and an operation restricting mechanism (e.g., contact trip assembly 21) and its switch CTS, the controller 38 may be connected to the battery 22 to receive power therefrom and the drive actuator 36 may be activated. The controller 38 may signal the motor 32 to energize or activate for a predetermined amount of time (e.g., by applying voltage to the motor 32) before activating the drive actuator 36. As is understood by a person of ordinary skill in the art, the controller 38 is configured for outputting a driving control signal to the drive system 19 and for outputting a motor signal to control an operation of the motor 32 via selectively energizing coils (of the stator) of a plurality of phases of the motor 32. In one embodiment, the controller 38 may include the control unit and/or features of the control unit as disclosed in U.S. Pat. No. 10,693,344 ("the '344 Patent"), which is commonly assigned and is incorporated by reference herein in its entirety.

The controller 38 may be configured to control a supply of power from the power source 25 to the motor 32 to initiate a drive cycle/sequence/stroke. The drive cycle/sequence/stroke may include a time from which the driver 26 is activated to engage and drive the fastener in the drive channel DC into the workpiece to a time until the driver 26 is retracted along the drive axis 29 to clear the drive channel DC and to allow for feeding of a subsequent fastener into the drive channel DC. The controller 38 may receive signals whether the fastener tool 10 is in the sequential activation mode or in the bump/contact activation mode.

Figure 7:
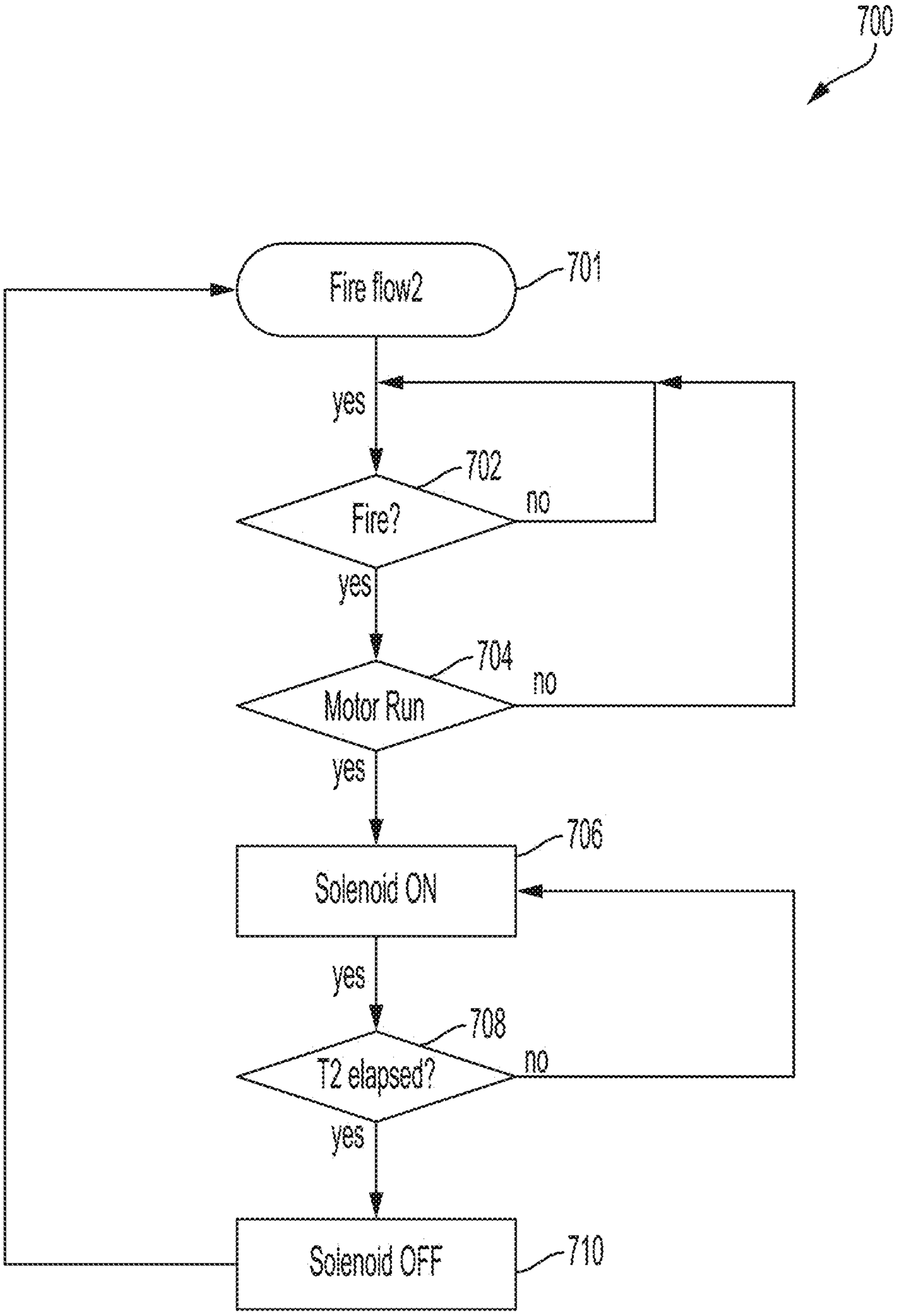
FIG. 7 shows a method of operation of a fastener tool in accordance with an embodiment of the present patent application.

The controller 38 may further be programmed to generate output signals that control the activation of a pair of drive solenoids. A first drive solenoid 36 is part of the power take-off assembly PTO that controls the initiation of the drive stroke, and hence, the firing of the fastener tool 10. The second drive solenoid (not shown) is part of a driver retraction assembly that serves to retract the driver 26 and return it to its original starting position following the completion of the drive stroke. The second solenoid may be optional FIG. 7 shows a method 700 of operation of the fastener tool 10. The method 700 comprises i) controlling the motor 32 to be in its energized state before implementing the firing sequence and before controlling the actuator 36/92; and ii) controlling the actuator 36/92 to initiate the drive engagement between the flywheel 34 and the driver 26 to transmit energy from the flywheel 34 to the driver 26 so as to move the driver 26 along the drive axis 29 while the motor 32 is still in its energized state. That is, the controller 38 is configured to i) control the actuator 36 to initiate a drive engagement between the driver 26 and the flywheel 34, and ii) control the motor 32 to remain in its energized state while the flywheel 34 is in the drive engagement with the driver 26 transmitting the energy from the flywheel 34 to the driver 26 so as to move the driver 26 along the drive axis 29.

The firing sequence includes a drive event for driving a lead fastener into the workpiece using the driver. The motor 32 may be configured to be energized for the entirety of the drive event, and the motor 32 may configured to continue to be energized after the drive event, that is even after the actuator 36 is de-energized and the driver 26 has disengaged from the flywheel 34. While the motor 32 is still energized, the driver 26 may be configured to reset to its home position to be ready for the next drive event. This is how time between shots is reduced and, therefore, the user can fire fasteners at a faster rate.

In another embodiment, the method may also comprise i) controlling the motor 32 to be in its energized state before controlling the actuator 148/150; and ii) controlling the actuator 148/150 to facilitate the advancement of (to move forward) the nail/fastener from the feeder 110 (e.g., towards the driver 26/the drive axis 29) while the motor 32 is still in its energized state. That is, the controller 38 is configured to i) control the actuator 148/150 to facilitate the advancement of (to move forward) the nail/fastener from the feeder 110, and ii) control the motor 32 to remain in its energized state while the actuator 148/150 facilitates the advancement of (to move forward) the nail/fastener from the feeder 110. The actuator 148/150 may be configured to advance the nails/fasteners from the feeder 110. In another embodiment, the actuator 148/150, may be used in combination with a spring (described in detail below), may be configured to advance the nails/fasteners from the feeder 110.

In one embodiment, the fastener tool 10 that drives a fastener into a workpiece includes the housing 16, the nose assembly 18 connected with the housing 16, the motor 32, the feeder 110, the feed actuator 148/150, and the controller 38. The nose assembly 18 includes the drive channel DC into which the fastener to be driven into the workpiece is fed. The drive channel DC includes the drive axis 29. The motor 32 is disposed in the housing 16. The motor 32 is configured to be in either its energized state or its deenergized state. The feeder 110 is configured to feed a lead fastener into the nose assembly 18. The feed actuator 148/150 is configured to move the lead fastener into the nose assembly 18. The controller 38 includes one or more processors. The controller 38 is operatively connected to the motor 32 and the feed actuator 148/150 to implement a firing sequence for feeding the lead fastener into the nose assembly 18. The controller 38 is configured to: control the feed actuator 148/150 to facilitate movement of the lead fastener into the nose assembly 18, and control the motor 32 to remain in its energized state while the feed actuator 148/150 moves the lead fastener into the nose assembly 18. The feed actuator 148/150 may include an electromechanical device. The feed actuator may include a feed solenoid. The fastener tool may further comprise the driver 26, the flywheel 34, and the drive actuator 36/92. The driver 26 may be configured to be movable along the drive axis 29 to engage and drive the fastener in the drive channel DC into the workpiece. The flywheel 34 may be disposed in the housing 16 and may be configured to be driven by the motor 32. The flywheel 34 may be configured to transmit energy to the driver 26 to cause the driver 26 to move along the drive axis 29. The drive actuator 36/92 may be configured to move the driver 26 into engagement with the flywheel 34 such that energy is transferred from the flywheel 34 to the driver 26. The controller 38 may be operatively connected to the motor 32 and the drive actuator 36/92 to implement the firing sequence for driving the fastener in the drive channel DC into the workpiece. The firing sequence may include a first electric pulse to the drive actuator 36/92 for driving the fastener in the drive channel DC into the workpiece and a second electric pulse to the feed actuator 148/150 for feeding the lead fastener into the nose assembly 18.

The feed actuator 148/150 may be implemented independently from the flywheel 34 and drive actuator 36/92. The feed actuator 148/150 may be implemented in any fastening/fastener system where energy needs to be stored prior to releasing for the drive event (i.e., flywheel, mechanical spring, gas spring, air pump, electrical energy in capacitor). Most forms of the mechanical energy storage for the fastening devices use a motor to store potential energy. While energy is being stored for the next firing event, the feed actuator 148/150 can be activated.

The controller 38 may be configured to signal the motor 32 to energize or activate for a predetermined amount of time (e.g., by applying voltage to the motor 32). As is understood by a person of ordinary skill in the art, the controller 38 may be configured for outputting a driving control signal to the drive system 19 and for outputting a motor signal to control an operation of the motor 32 via selectively energizing coils (of the stator) of a plurality of phases of the motor 32. A position detector may be associated with the motor 32 to output a position signal corresponding to the position of a rotor (at one place) of the motor 32. The position detector may be a magnetic sensor such as a hall sensor/element or a hall IC, for example, and a hall signal may be output as the position signal. The position signal output from the position detector is input to the controller 38. The controller 38 may include an inverter circuit design to output a control signal to the motor 32, to control the rotation of the motor 32. The inverter circuit may have six switching elements for supplying driving current to the respective coils of the motor 32. Three of the six switching elements are high-side switching elements and three of the six switching elements are low-side switching elements.

FIG. 7 shows a flow chart of the method 700 of operation of the fastener tool 10. The operation of the fastener tool 10 may include an operator/user positioning the nosepiece assembly 18 in position on the workpiece. As the operator places bias on the fastener tool 10 towards the workpiece, the contact trip assembly 21 is moved or actuated, placing the fastener tool 10 in an active state, waiting for the trigger 20 to be pulled or depressed. The controller 38 may send a signal to the motor 32 to energize the motor 32 after the contact trip switch CTS is tripped. The method 700 begins at procedure 701. At procedures 702 and 704, a nail firing event starts and the motor 32 is energized (i.e., activate power to the motor 32).

At procedure 706, while the motor 32 is still in its energized state, controlling the actuator 36/92 to initiate the drive engagement between the flywheel 34 and the driver 26 to transmit energy from the flywheel 34 to the driver 26 so as to move the driver 26 along the drive axis 29. For example, at procedure 706, providing the pulse PTO to the drive actuator 36 activates the drive actuator 36. That is, at procedure 706, the controller 38 is configured to control the motor 32 to remain in its energized state while the flywheel 34 is in the drive engagement with the driver 26 transmitting the energy from the flywheel 34 to the driver 26 so as to move the driver 26 along the drive axis 29.

When the trigger 20 is pulled by the operator, the trigger switch TS is closed, initiating the controller 38 to activate the drive actuator 36, and thus drive a fastener. Accordingly, the driver 26 drives the lead fastener into the workpiece. At procedure 708, a time period/delay T is implemented after activating the drive actuator 36 and before deactivating the drive actuator 36. The time delay T may define the time of activation of the drive actuator 36. At procedure 710, the drive actuator 36 is deactivated. The drive actuator 36 is deactivated by the controller 38 after the fastener is driven into the workpiece.

The controller 38 may be configured to implement a firing sequence for driving a lead fastener into the workpiece (using the driver 26) and feeding the lead fastener into the nosepiece assembly 18 (using the feed assembly 110). The controller 38 may be configured to control the timing for actuating/activating the drive actuator 36 and the feed actuator 148, and, thus, the timing for feeding an electric pulse to each of the drive actuator 36 and the feed actuator 148, for the firing sequence (i.e., driving a fastener and (re)loading a lead fastener into the nosepiece assembly 18 for the next drive). That is, the firing sequence may include sending a first electric pulse to the drive actuator 36 and a second electric pulse to the feed actuator 148.

The firing sequence implemented by the controller 38 results in an excitation pattern that includes controlling the motor 32 to remain in its energized state while the flywheel 34 is in the drive engagement with the driver 26 transmitting the energy from the flywheel 34 to the driver 26 so as to move the driver 26 along the drive axis 29. The excitation pattern may also include controlling the motor 32 to remain in its energized state while the feed actuator 148 is activated.

The controller 38 may be configured to control the motor 32 to remain in its energized state for each electric pulse (the first electric pulse and/or the second electric pulse) sent to the drive actuator 36 and to the feed actuator 148, in order to activate the drive actuator 36 and the feed actuator 148. In one embodiment, the excitation pattern comprises a delay time interval between the electric pulses to the drive actuator 36 and the feed actuator 148. The controller 38 may be configured to calculate timing in the excitation pattern for feeding the first electric pulse to the drive actuator 36 and the second electric pulse to the feed actuator 148 for activation thereof during the firing sequence, and calculate a delay time interval between the first and second electric pulses.

Figure 8:
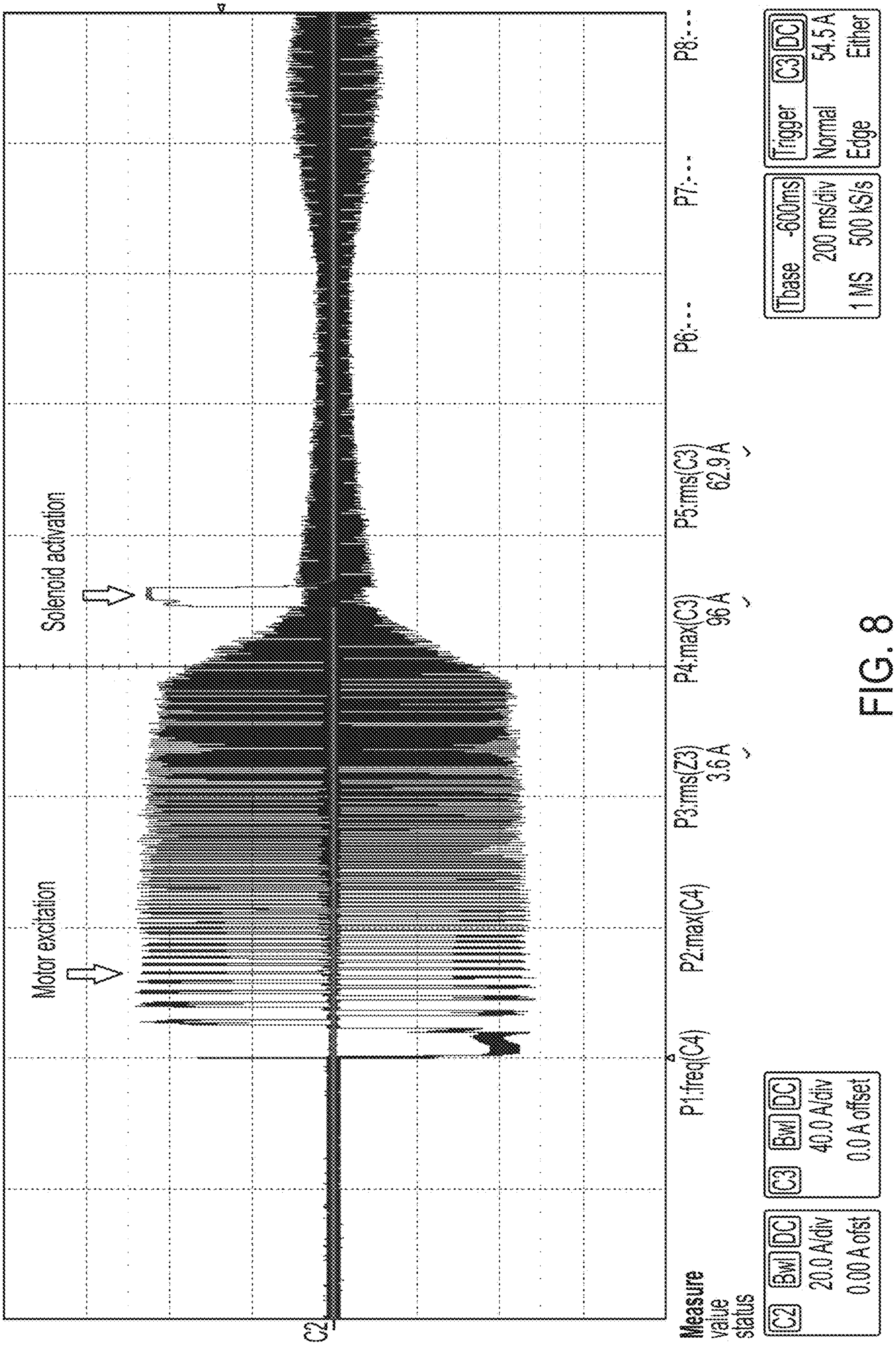
FIG. 8 is a graphical representation that shows motor and actuator/solenoid are both are excited together in accordance with an embodiment of the present patent application.
Figure 9:
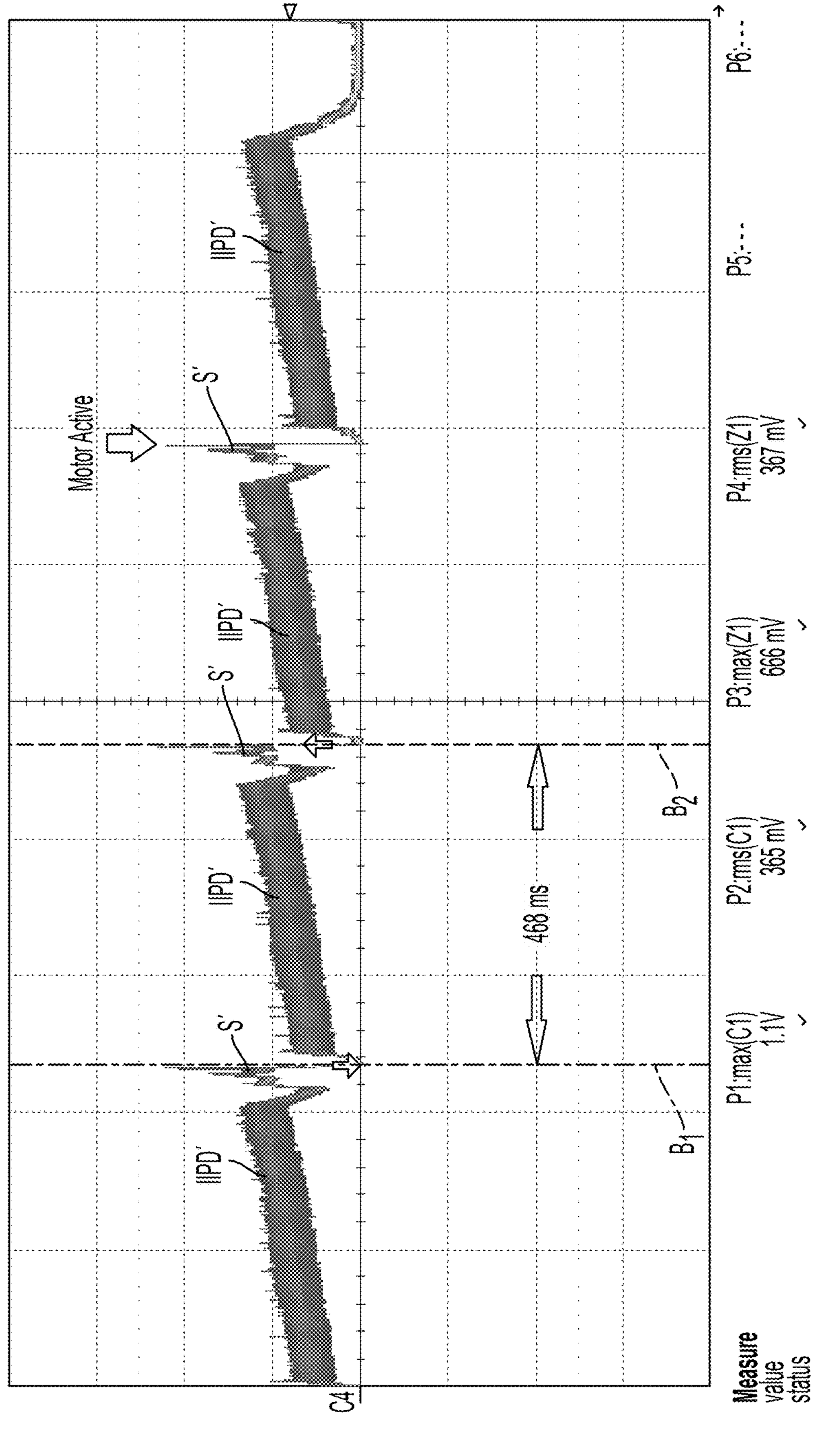
FIG. 9 shows a current draw from a battery of a fastener tool, during a nail firing event, in accordance with an embodiment of the present patent application.
Figure 10:
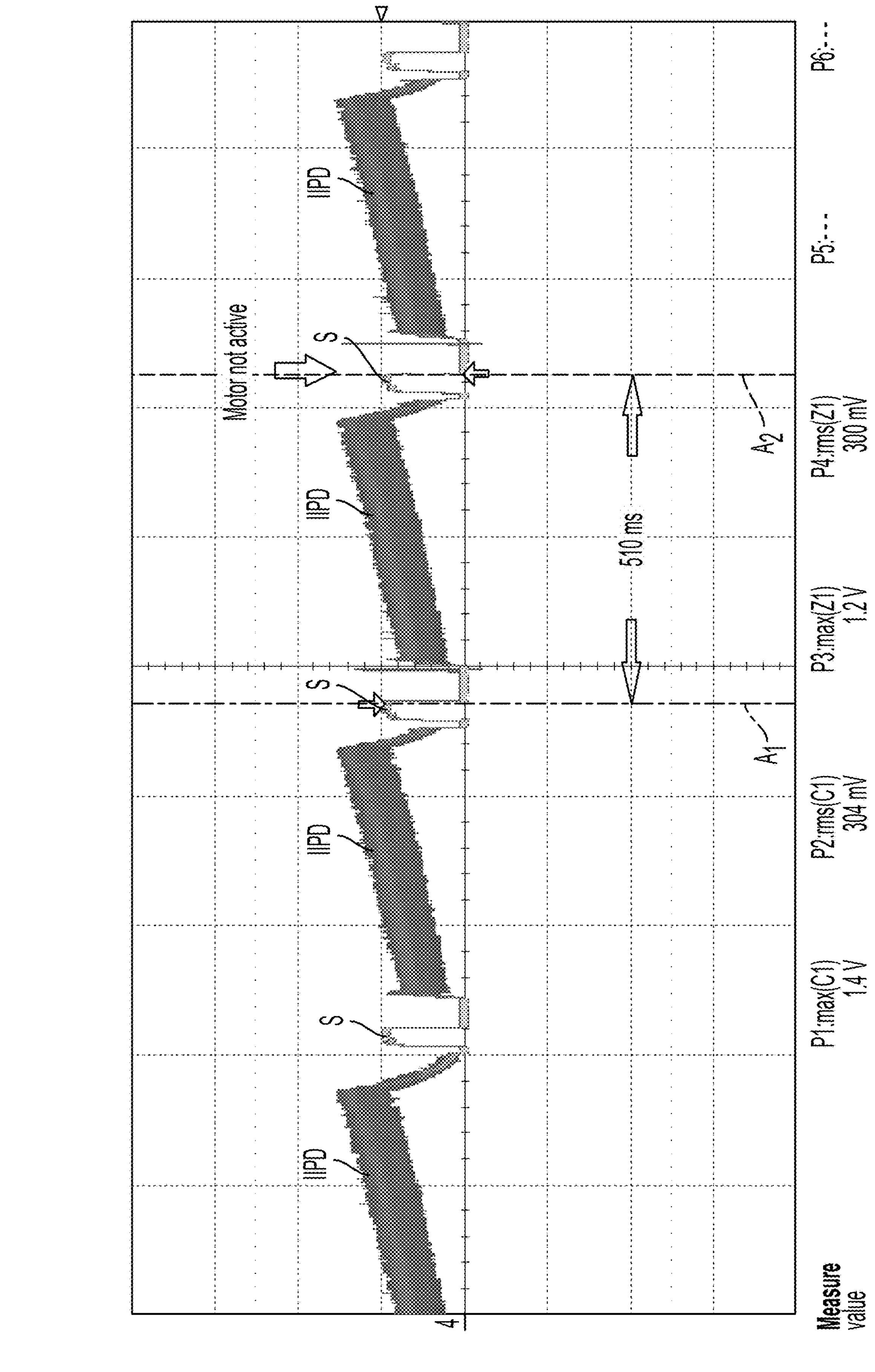
FIG. 10 PRIOR ART
FIG. 10 shows a current draw from a battery of a prior art fastener tool during the nail firing event.
Figure 11:
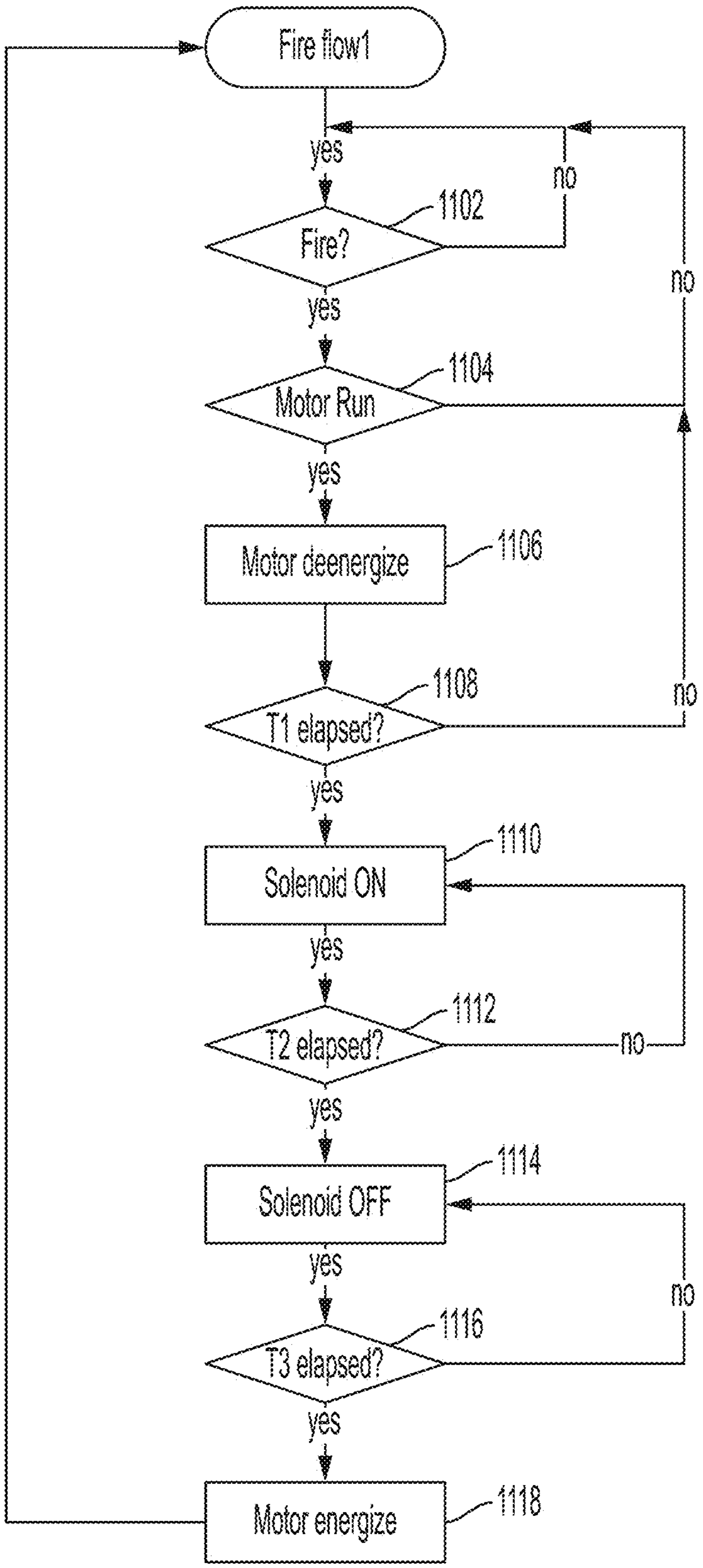
FIG. 11 PRIOR ART
FIG. 11 shows a method of operation of a prior art fastener tool.

FIGS. 8 and 9 show output waveforms provided as a result of signals from the controller 38 to the motor 32 and the drive actuator 36. The motor 32 may be initially energized or activated by the controller 38 before implementing a firing sequence (see, e.g., voltage signal (e.g., 5 V (Volts)) for motor 32). A larger amount of power may be supplied to the motor 32 for energization thereof when power is turned on for the fastener tool 10. Activation of the contact trip switch CTS may also provide additional power to the motor (e.g., anticipating that the trigger 20 will soon be pulled, and thus that driving of a nail will soon commence.). A substantially constant signal (e.g., 5 V) may be supplied to the motor 32 for energization thereof when power is turned on for the fastener tool 10. A voltage (e.g., 5 V) signal is provided to the contact trip switch CTS. Upon tripping of the contact trip switch CTS and while controlling the motor 32 to remain in its energized state, a pulse PTO (e.g., a current of 20 A) is provided to the drive actuator 36. While the drive actuator 36 (and thus the drive system 16) is energized, power to the motor 32 is not cut off. That is, while the drive actuator 36 (and thus the drive system 16) is energized, the motor 32 is in its energized state and continues to run.

Another time delay may be implemented before the controller 38 deploys a pulse FED (e.g., a current of 20 A) to the feed actuator 148. In one embodiment, the power signal to the motor 32 may be cut off during this pulse FED. In another embodiment, the power signal to the motor 32 may be not cut off during this pulse FED. That is, while the feed actuator 148 is energized, the motor 32 is in its energized state and continues to run.

As a result of the pulse FED, a plunger may be moved downward against the force of spring to allow a nail to be loaded. When the feed actuator 148 is deactivated, the spring biases the shaft of the plunger upward and allows the next nail to be loaded into a chamber (or drive channel) for the driver 26. Upon completion of the pulse FED, the motor 32 may be de-energized.

FIG. 9 shows current draw from a battery of a fastener tool 10 during the nail firing event. Referring to FIG. 9, an initial increase in power draw IIPD' is due to the flywheel 34 ramping up to the desired RPM/speed. Once the flywheel 34 has reached desired speed, the flywheel 34 is still continuously powered (i.e., the motor 32 is still active). While the motor is still active, the drive actuator 36 is activated. FIGS. 8 and 9 both show that the motor 32 and the driver actuator/solenoid 36/92 are both excited together or excited at the same time.

Referring to FIG. 9, the spike S' is due to the activation of the PTO/drive actuator 36. As can be seen in FIGS. 8 and 9, the motor is still excited and powered on, when the driver actuator/solenoid 36/92 is actuated. The dashed lines $B_1$ and $B_2$ designate the time between single nail firing events. For example, as shown in FIG. 9, the time between the single nail firing event may be 468 milliseconds (ms). As would be appreciated by a person of ordinary skill in the art, comparing the excitation pattern of the fastener tool of this patent application with the excitation pattern of the prior art fastener tool, the time between the single nail firing event of this patent application has decreased from 510 ms to 468 ms due to continuously powered flywheel 34.

Accordingly, the controller 38 is configured to perform a method that includes activating power to the motor 32; and activating the drive actuator 36 to thereby cause the translational movement of the driver 26 (while the power to the motor 32 is on and the motor 32 is still in its energized state) thus drive the lead fastener into the workpiece. That is, the power to the motor 32 is not cut off or deactivated on or about (e.g., shortly after) a time for applying the PTO pulse to the drive actuator 36. That is, the motor 32 is in its energized state before activating the drive actuator 36 and/or within a predefined time period after activating the drive actuator 36.

The controller 38 may also configured to perform a method that includes activating the feed actuator 148 to feed the lead fastener into the nosepiece assembly 18 while the power to the motor 32 is on and the motor 32 is still in its energized state. The controller 38 is also configured to deactivate the feed actuator 148. The controller 38 is configured to deactivate the feed actuator 148 after a predetermined time period/delay. The predetermined time period/delay defines the time the feed actuator 148 is activated.

As understood by a person of ordinary skill in the art, the timing sequence may be based on a pre-programmed sequence that is based on time intervals known for performing each of the actions (e.g., driving the driver 26, feeding the nail). In one embodiment, one or more sensors may be used in the fastener tool 10 to communicate with the controller 38 regarding the firing cycle and/or status (e.g., speed) of the motor 32.

The fastener tool 10 may include the magazine 14, which may be coupled to the housing 16. The magazine may be interchangeably referred to as magazine assembly. The magazine 14 may be coupled to the nose assembly 18 and disposed in the housing 16. The magazine 14 is configured to carry a supply of fasteners through a feed channel along a feed channel direction toward the nose assembly 18. The feeder 110 may be operatively connected with the magazine and may be configured to feed the fastener through the magazine 14 and into the drive channel DC prior to driving the fastener into the workpiece.

The magazine 14 is an elongated receptacle that extends away from the nose assembly 18, towards a back end of the handle 226. The magazine 14 may be provided such that it extends between the nosepiece 18 and a base portion of the fastener tool 10 (e.g., near a removable battery pack 22 as shown in FIG. 1). The magazine 14 may be positioned an acute angle relative to the handle 226 and extending between the nose assembly 18 and a bottom portion of the handle 226, such that a bottom portion of the magazine 14 may be positioned at an acute angle relative to a workpiece when the nose assembly 18 is positioned and is configured for applying the fastener thereto.

The magazine 14 may be configured to hold a plurality of fasteners or nails and sequentially feed the fasteners into the nose assembly 18. These fasteners or nails are then configured to be dispensed from the fastener tool 10 with sufficient energy to penetrate the workpiece. The magazine 14 may be configured to hold collated nails. The magazine 14 may include a canister 200 (as shown in FIG. 1) that is configured to hold coiled, collated nails/fasteners. The magazine 14 (via its parts therein) may generally be configured to sequentially feed/present a lead fastener of the plurality of fasteners into the drive channel DC of the fastener tool 10. The magazine 14 may include the feeder 110. The magazine 14 may be opened to load collated fasteners into the magazine 14 as described in detail in the incorporated '521 Patent. The further details of the magazine 14 are provided in the incorporated '521 Patent and the incorporated '404 Patent Application.

The trigger 20 may be adjacent to or on the handle 226 and may be connected to the controller 38 (also interchangeably referred to as a control unit or a power control module). The trigger 20 may be provided in the form of a button for manual operation such that when an operator/a user grips the handle 226, the trigger 20 may be engaged by a forefinger of the operator/user. The trigger 20 is mechanically coupled to the handle 226 and is electrically coupled to at least the motor 32 and controller 38 such that electric power may be selectively provided thereto. The trigger 20 may be a push button that moves back and forth, or a button that may be pivotally mounted to the housing 16 by way of a pivot, such that application of force via the operator's forefinger moves the trigger 20 relative to the handle 226. The trigger 20 may be associated with a trigger switch/sensor TS. The trigger 20 may also be associated with the contact trip assembly 21 and the controller 38.

The contact trip assembly 21 is configured to prevent accidental activation of the fastener tool 10. Generally, an operator of the fastener tool 10 may hold or grip the fastener tool 10 by providing their hand around the handle 226 and place the nose assembly 18 at a desired location for applying the fastener, push down on the contact trip assembly 21, and depress the trigger 20 in order to activate the controller 38 and the internal actuators (as will be described in detail later) and to cause the fastener to be ejected at that desired location. In one embodiment, the contact trip assembly 21 may be provided on the nose assembly 18. The contact trip assembly 21 may be coupled to the nose assembly 18 for sliding movement thereon. In operation, the contact trip assembly 21 must first be deactivated in order to propel the driver 26 and drive the fastener into the workpiece.

Other operation restricting devices (e.g., mechanical and/or electrical, like switches) may also be provided in the fastener tool 10. The contact trip assembly 21 may include a contact trip (or contact trip member) actuatable to initiate the drive stroke. The contact trip may be positioned in front of the driver 26 in the housing 16 of the fastener tool 10. The contact trip is configured for movement relative to the housing 16 parallel to the movement of the driver 26. Also, provided are a contact trip spring and a contact trip switch CTS. The contact trip switch CTS is configured such that the contact trip switch CTS may be tripped or actuated (e.g., closed) to allow use of the fastener tool 10 (when all conditions are met for driving or firing), and may also be electrically coupled to the controller 38. The contact trip switch CTS may be provided in a normally open position and closed when the contact trip spring is compressed by force upon the contact trip itself, for example. In one embodiment, as an operator applies force or bias on the fastener tool 10, i.e., towards a workpiece, a contact surface of the contact trip assembly 21 engages the workpiece and then actuates movement of the body of the contact trip relative to the drive channel DC, thereby closing the contact trip switch CTS and spring-loading or compressing the contact trip spring that normally biases the contact trip assembly 21 relatively forward such that the fastener tool 10 is disabled from firing.

When the trigger 20 is actuated by the operator's forefinger (e.g., the trigger switch TS is closed) and all other conditions for firing are met, the drive system 19 and thus the motor 32 may be initiated i.e., activated or energized, to fire a fastener. Such features are known by a person of ordinary skill in the art and thus not further described here. That is, the trigger switch TS may be configured to generate a trigger signal that may be employed in whole or in part to initiate the cycling of the fastener tool 10 to install a fastener to a workpiece.

The contact trip assembly 21 may be configured to slide rearwardly in response to contact with a workpiece and may interact with either the trigger 20 or the contact trip sensor/switch CTS. When the contact trip assembly 21 interacts with the trigger 20, the contact trip assembly 21 cooperates with the trigger 20 to permit the trigger 20 to actuate the trigger switch TS to generate the trigger signal. More specifically, the trigger 20 may include a primary trigger, which is actuated by a finger of the user, and a secondary trigger, which is actuated by sufficient rearward movement of the contact trip assembly 21. Actuation of either one of the primary and secondary triggers will not, in and of itself, cause the trigger switch 20 to generate the trigger signal. Rather, both the primary and the secondary trigger must be placed in an actuated condition to cause the trigger 20 to generate the trigger signal. When the contact trip assembly 21 interacts with the contact trip sensor/switch CTS, rearward movement of the contact trip assembly 21 by a sufficient amount causes the contact trip sensor/switch CTS to generate a contact trip signal, which may be employed in conjunction with the trigger signal to initiate the cycling of the fastener tool 10 to install a fastener to a workpiece.

The feeder 110 may be configured to feed the fastener into the drive channel DC of the nose assembly 18 prior to the driver 26 driving the fastener into the workpiece. The feeder 110 may include a start time defining a time at which the feeder 110 is activated to feed the subsequent fastener into the drive channel DC. That is, the feeding cycle may include the activation of the feeder/feed solenoid and feeding of the next/subsequent nail into the drive path or drive channel DC.

The feeder 110, shown in FIG. 1, may include a feed pawl assembly (not shown) and a follower pawl assembly (not shown). The feed assembly 110 is operatively associated with the magazine 14 and is configured to advance the fasteners contained therein in a feed direction (i.e., towards the drive channel DC, the nose assembly 18 and the driver 26) to present a lead fastener into the nose assembly 18. The feed assembly 110 has the feed actuator 148 that is configured to move the lead fastener into the nose assembly 18.

A coil or a set of the collated fasteners may be inserted into the canister 200 and an end of the collated fasteners with a lead fastener may be strung towards the drive channel DC such that one of the collated fasteners is positioned in the feed assembly 110 for feeding (e.g., using teeth and/or a pawl assembly, and the feed actuator 148).

The feed assembly 110 may include a biasing spring and a feed rod configured to move the lead fastener (from the set of collated fasteners contained in the canister 200) into the nose assembly 18. The biasing spring may bias the feed rod into a first position, and the feed actuator 148 may be configured to move (i.e., reciprocate) the feed rod to a second position, against a biasing force of the biasing spring, for moving the lead fastener into the nose assembly 18. The features of the feed assembly 110 may include those of the incorporated '521 Patent or the incorporated '404 Patent Application.

The fastener tool 10 may include two actuators-one actuator 36 for driving a fastener, another actuator 148 for feeding the fastener, one or both of the actuators which are controlled by the controller 38, along with the motor 32, in order to drive and load fasteners in succession and, in some cases, ready the fastener tool 10 such that shot-to-shot time of fasteners is increased. In one embodiment, the feed actuator 148 may be optional.

The actuator 36 may be operatively connected to the controller 38. The actuator 36 may be configured to move the driver 26 into engagement with the flywheel 34 such that energy is transferred from the flywheel 34 to the driver 26 and to disengage the flywheel 34 from the driver 36 (e.g., after the drive cycle/sequence/stroke). The actuator 36 is a drive actuator. The drive actuator includes a drive solenoid 92. The drive actuator 36 may be an electro-mechanical actuator such as a linear actuator. The drive actuator 36 may include an electromechanical device. The electromechanical device may be configured to convert the rotational force of an electric rotary motor into a linear movement to generate the requested/desired linear movement through a mechanism either a belt (Belt Drive axis with stepper or servo) or a screw (either a ball or a lead screw or planetary roller screw).

Figure 4:
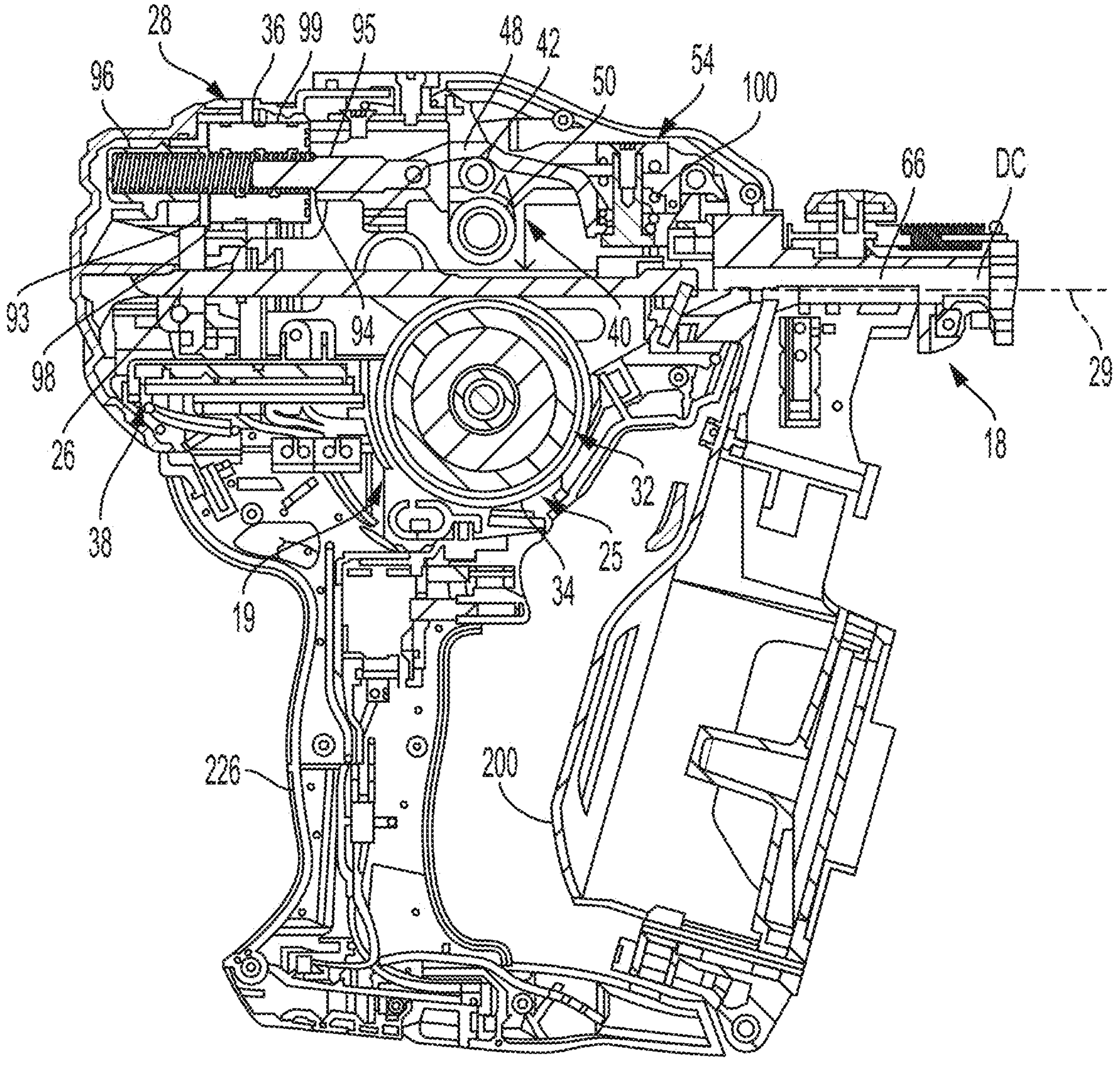
FIG. 4 is a cross-sectional view along line A-A of the tool in FIG. 3 showing features of a drive actuator and a drive system in accordance with an embodiment of the present patent application.

The drive actuator 36 is the solenoid 92 that includes a body 93, a plunger 94 in the form of a shaft which is movable relative to the body 93 along an actuation axis 95, and a plunger spring 96 that biases the plunger 94 into an extended position. While the plunger spring 96 is illustrated in FIG. 4 as being received in the body 93, it will be appreciated by a person of ordinary skill in the art that, in the alternative, the plunger spring 96 can be received about the plunger 94 between a feature on the plunger 94 and the plunger body 93 or between a feature on the plunger 94 and another part adjacent the body 93. The body 93 may include a housing 98 and a coil assembly 99 therein that can be electrically coupled to the control unit 38. The body 93 may be fixedly coupled to the carriage 44 in a snap-fit manner, in accordance with an embodiment. The housing 98 may be sized to engage the arm members 56 such that abutment of the housing 98 against the arm members 56 limits movement of the body 93 relative to the arm members 56 when the coil assembly 99 is energized and the plunger 94 is being drawn into the body 93. The plunger 94 may include a through-hole for receipt of a pin 100 which is used to pivotally couple the follower arm 48 and the plunger 94. Accordingly, the actuator slots 58 (shown in FIG. 5), which may be disposed generally parallel to the actuation axis 95, may guide and support the end of the plunger 94 to which the follower arm 48 is coupled. Other/additional details about the drive actuator 36 may be found in the incorporated '404 Patent Application.

The controller 38 may be operatively connected to the feed actuator 148 and that feeder 110. The controller 38 may be configured to implement a firing sequence for driving a lead fastener into the workpiece using the driver 26 and for feeding the lead fastener into the nose assembly 18 feeding the lead fastener into the nose assembly 18 using the feeder 110. The feed actuator 148 may include a feed solenoid 150. The feed actuator 148 may be configured to move the lead fastener into the nose assembly 18. The firing sequence may include a first electric pulse to the drive actuator 36 and a second electric pulse to the feed actuator 148.

Figure 2:
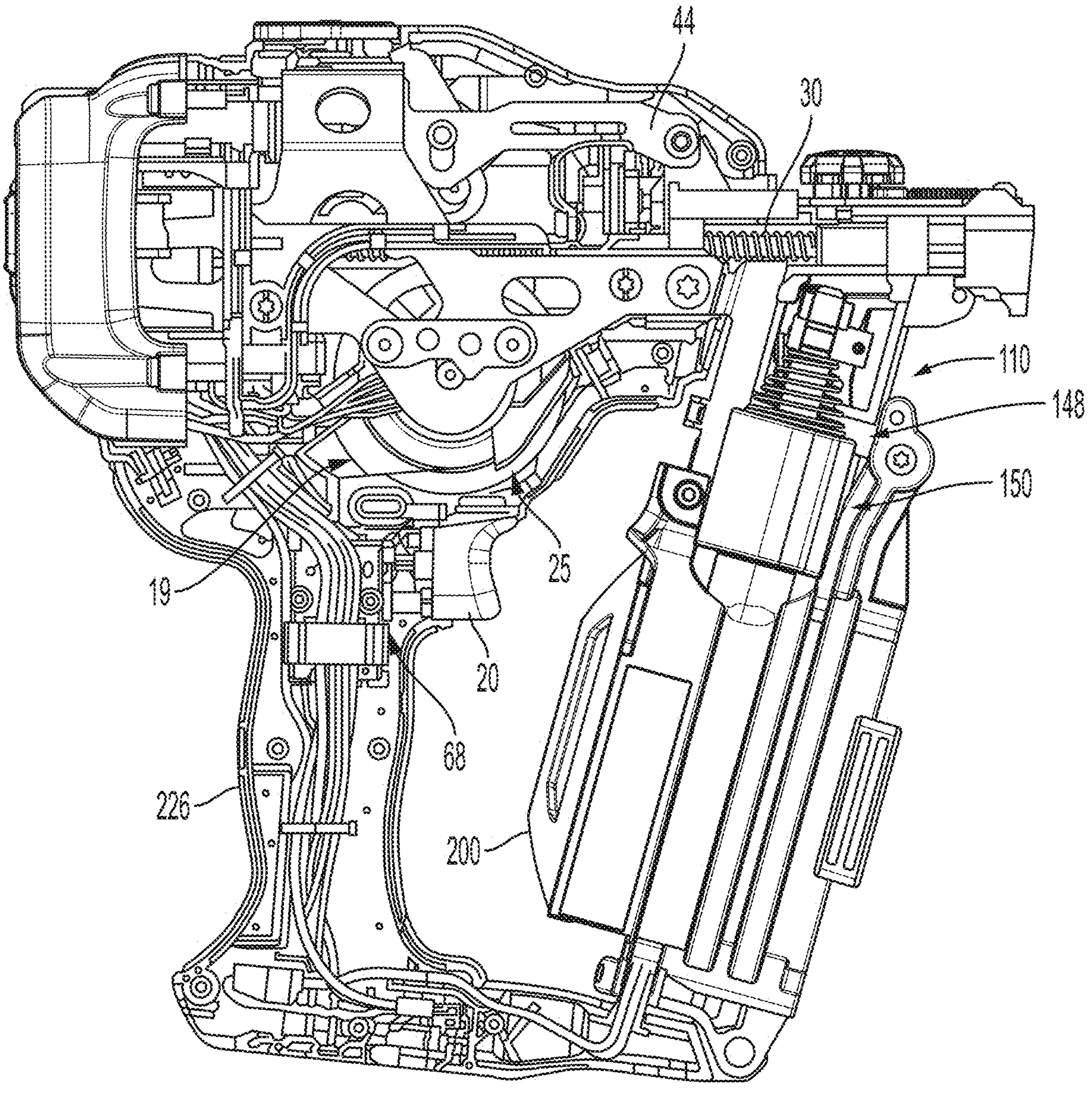
FIG. 2 shows a front view of the fastener tool of FIG. 1, with some portions of a housing of the fastener tool removed to better illustrate other portions of the housing therein.
Figure 3:
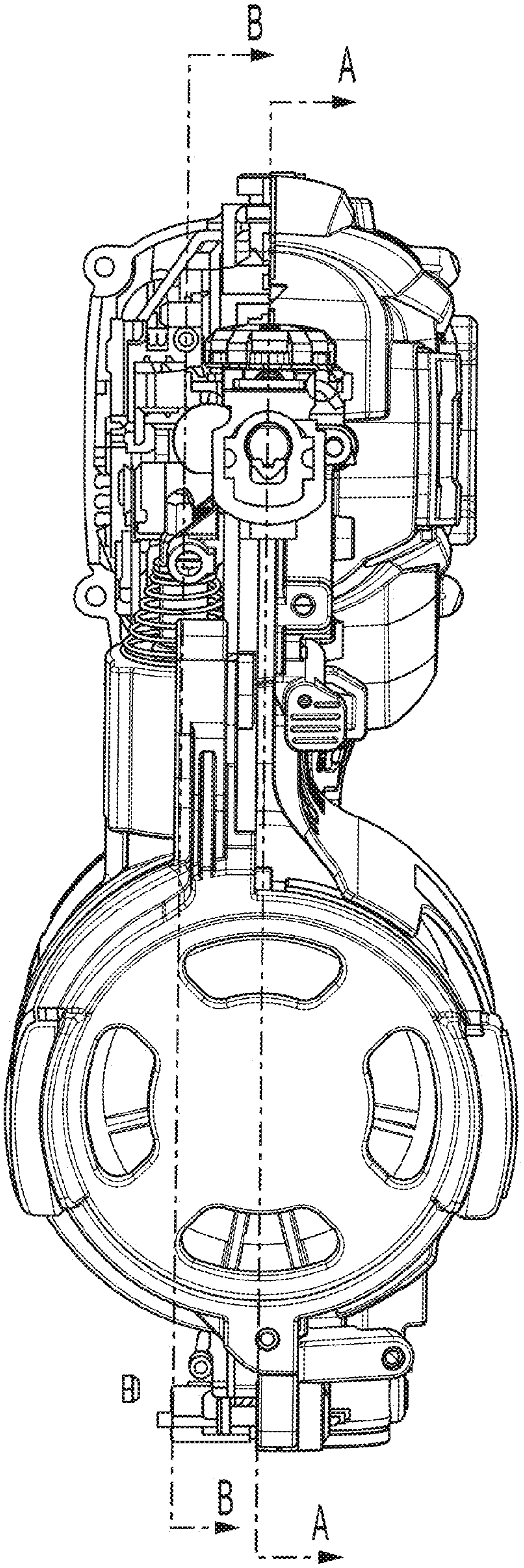
FIG. 3 illustrates a front elevation view of the tool as shown in FIGS. 1 and 2.
Figure 5:
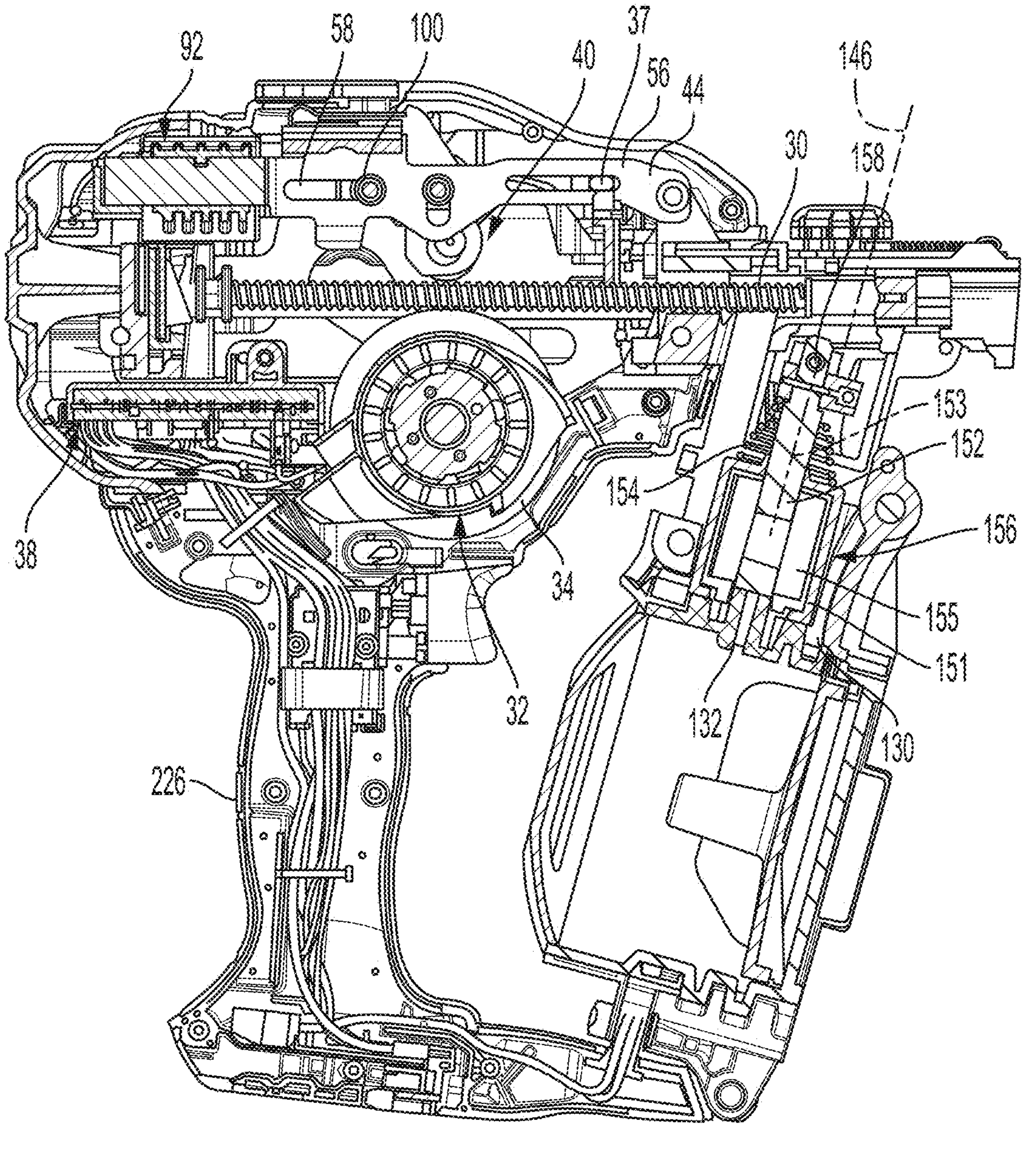
FIG. 5 is a cross-sectional view along line B-B of the tool in FIG. 3 showing features of a feed actuator and a feed system in accordance with an embodiment of the present patent application.
Figure 6:
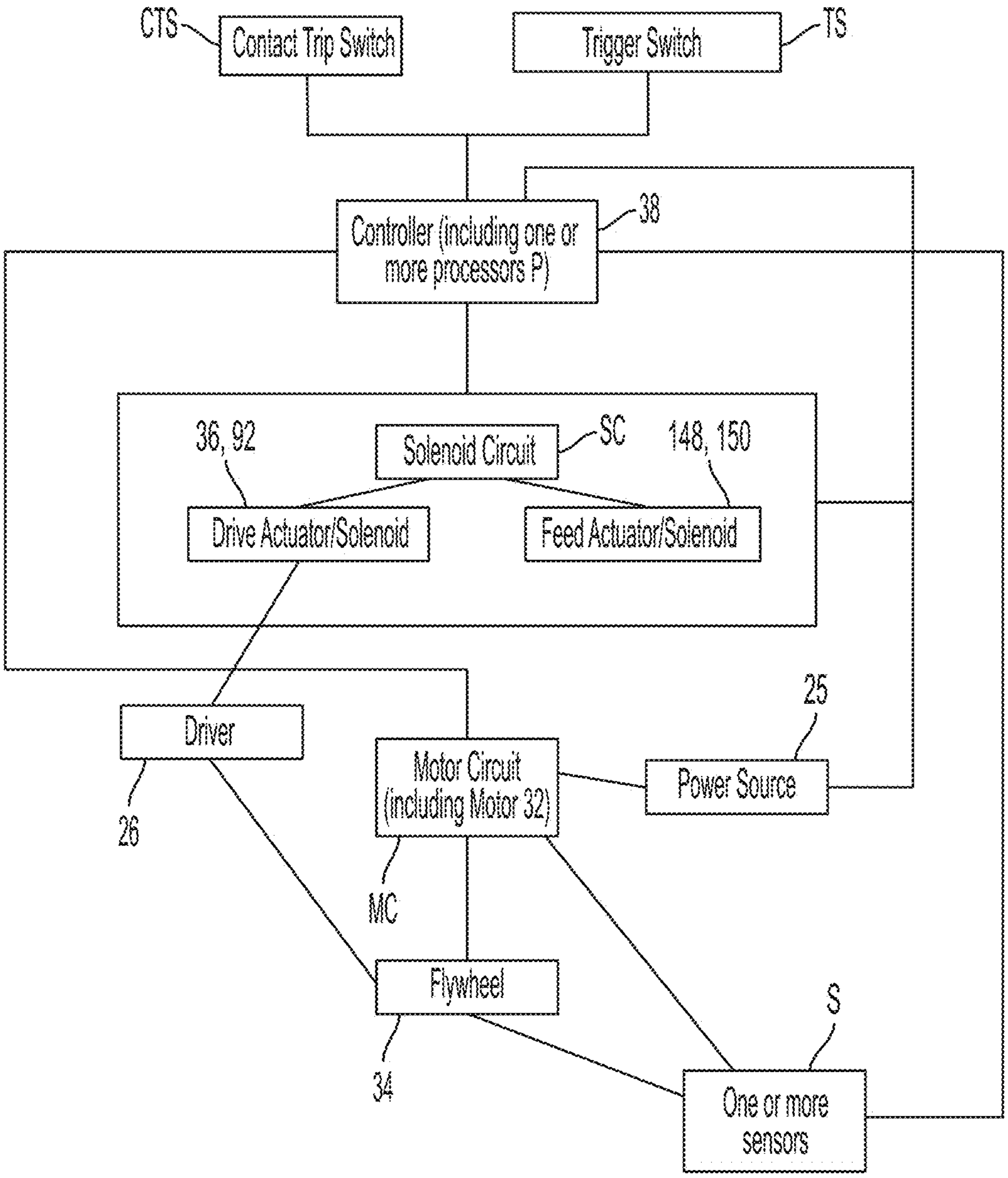
FIG. 6 illustrates a schematic representation showing electrical and/or operative connections between controller, power source, one or more sensors, and drive and feed actuators, as well as some of switches, flywheel, driver and motor included in the fastener tool in accordance with an embodiment of the present patent application.

Like the drive actuator 36, the feed actuator 148 may be an electro-mechanical actuator such as a linear actuator. The feed actuator 148 may include an electromechanical device. The feed actuator 148 may be an electrical actuator. The feed actuator 148 may be in the form of a feed solenoid 150, in accordance with an embodiment. Referring to FIGS. 2 and 5, the feed actuator 148 may be in the form of the solenoid 150, in accordance with an embodiment, that includes a body 151, a plunger 152 in the form of a shaft which is movable relative to the body 151 along an actuation axis 153, and a plunger spring 154 that biases the plunger 152 into an extended position, e.g., towards the nose assembly 18. While the plunger spring 154 is illustrated as being outside the body 151, it will be appreciated that in the alternative, the plunger spring 154 may be received about the plunger 152 within part of the plunger body 151, for example. The body 151 may include a housing 156 and a coil assembly 155 that can be electrically coupled to the control module 38. The body 151 may be coupled to the feeder 110, below the nose assembly 18 and above the magazine 14/canister 200, in accordance with an embodiment. The plunger 152 may have an abutment structure associated therewith such that the plunger spring 154 extends between a top portion of the housing 156 (or body 151) and the abutment structure. Also, the plunger 152 may include a through-hole 158 at an upper portion thereof, e.g., for receipt of a spring (or portion thereof, see, e.g., FIG. 5), or pin. The housing 156 may be sized such that the plunger 152 is configured to move relatively therein and compress the plunger spring 154 when the coil assembly 155 is energized. In one embodiment, the plunger 152 may be drawn into the body 151. Accordingly, activation of the coil assembly 155 results in movement (e.g., pulling relatively downward) of the shaft of the plunger against the force of spring 154 to allow a nail to be loaded. When the feed actuator 148 is deactivated, the spring 154 biases the shaft of the plunger 154 upward and allows the nail to be loaded into a chamber (or drive channel) that is along the path of the driver 26. Other features of the feed actuator 148 may include those of the incorporated '404 Patent Application or the incorporated '521 Patent. For example, the feed assembly 110 and the feed actuator 148 may be an automatic coil feeder assembly.

In one embodiment, in the fastener tool 10, the drive actuator 36 is positioned on a first axis and the feed actuator 148 is positioned on a second axis. These first and second axes are positioned at a non-perpendicular angle relative to one another. In one embodiment, the first (or actuation) axis is positioned such that the axis is parallel to the drive axis 29. In another embodiment, the second (or actuation) axis is parallel to the feed direction (i.e., the axis extending at an angle from near a bottom of the fastener tool 10 to the nose assembly 18, see axis 146 in FIG. 5). In yet another embodiment, the first axis is positioned such that the axis is parallel to the drive axis 29, and the second axis is parallel to the feed direction. In one embodiment, the drive axis 29 of the drive actuator 36 is provided in a first plane and an axis of the feed actuator 148 defining the feed direction is provided in a second plane, and the first plane is different from the second plane. The axes and planes of the drive actuator 36 and the feed actuator 148 are also shown and described in the incorporated '404 Patent Application. While the exemplary illustrated embodiments are described as using solenoids (for the drive actuator 36 and the feed actuator 148) as the electro-mechanical actuators, other forms of actuators may be used, for example, an electric motor, a single dual-action solenoid, a multi-stage solenoid, a solenoid in conjunction with a mechanical biasing element, such as a spring, a linear motion machine, or any combination thereof.

In operation, fasteners are stored in the magazine assembly 14, which sequentially feeds the fasteners into the nose assembly 18. The drive motor assembly may be actuated/activated by the controller 38 to cause the driver 26 to translate and impact a fastener (i.e., in the drive channel DC) in the nose assembly 18 so that the lead fastener may be driven into a workpiece. Actuation of the power source 25 may use energy (e.g., electrical energy from the battery pack 22) to operate the motor 32 and the drive actuator 36. The motor 32 is employed to drive the flywheel 34, while the drive actuator 36 is configured to (e.g., move a roller that is associated with a roller assembly 40 that configured to) squeeze the driver 26 into engagement with the flywheel 34 so that energy may be transferred from the flywheel 34 to the driver 26 to cause the driver 26 to translate. The nose assembly 18 (and the drive channel DC) guides the fastener as it is being driven into the workpiece. Actuation of the drive actuator 36 causes the roller assembly 40 to translate toward (e.g., in a generally downward direction) and engage the driver 26 to initiate driving engagement between the driver 26 and the flywheel 34 and thus move the driver 26 into the drive channel DC of the nose assembly 18 that has a lead fastener therein.

After the driver 26 has translated and fired the fastener from the nose assembly 18, the return mechanism 30 may be employed to return the driver 26 to its starting position. The return mechanism 30 biases the driver 26 into a returned/its starting position. For example, the return mechanism 30 may include a biasing member, or spring, which is configured to push (e.g., backwards) the driver 26 back and away from the nose assembly 18 after the driver 26 is deployed to fire a fastener from the fastener tool 10. When the driver 26 has been returned, the solenoid/drive actuator 92 may be deactivated. In one embodiment, the drive actuator, the driver, and the drive system used in the fastener tool 10 may be an electrical actuator, drive, and drive system and are further described in U.S. Pat. No. 9,744,657 ("the '657 Patent"), which is commonly assigned and is incorporated by reference herein in its entirety.

The controller 38 may be configured to activate the solenoid/feed actuator 148. The actual motion of feeding the nails/fastener may be caused by a spring. The spring moves forward and advances the nails/fasteners (e.g., after the solenoid 150 is deenergized). That is, the controller 38 activates/energizes the solenoid, the spring is then pulled down and then the solenoid is deenergized. This pushes the nail/fastener forward. So, it is the combination of the spring and the solenoid that advance the nails/fasteners. When the solenoid 150 is deenergized, the movement (e.g., forward and advancement) of the nails/fasteners start. The time at which the solenoid 150 is energized may be referred to as the feed cycle start time (i.e., for both the sequential and the bump activation modes).

The fastener tool 10 may be an electric fastener tool. The electric power may be supplied, e.g., by a battery pack 22 or from being plugged into a common household AC outlet. The bottom end of the housing 16 may have a removable and rechargeable energy storage device, which may include the battery pack 22. The battery pack 22 may be configured to engage an end portion of the fastener tool 10 and provide power to the motor 32 within the housing 16, such that the fastener tool 10 may drive one or more fasteners that are fed from the magazine 14 into a workpiece. The location of the battery pack 22 as shown in the Figures is not limiting and is illustrative only; indeed, the battery pack 22 can be located anywhere on the fastener tool 10. In addition, although the energy storage device is illustrated as being a battery pack, embodiments of this patent application are not limited to battery packs being the energy storage device. That is, in some embodiments, the fastener tool 10 may include a cord and a plug for plugging into a common household AC outlet. While the fastener tool 10 is described as being electrically powered by a suitable power source or energy storage device, such as the battery pack 22, a person of ordinary skill in the art would appreciate that this patent application, in its broader aspects, may apply to other powered fastening tools.

The fastener tool 10 may have multiple modes of operation. For example, one mode of operation of the fastener tool 10 may be a sequential fire mode (or sequential operational mode) in which the contact trip assembly 21 is first be abutted against a workpiece (so that the contact trip sensor/switch CTS generates the contact trip sensor signal and thereafter the trigger switch TS is actuated to generate the trigger signal).

Another mode of operation of the fastener tool 10 may be a mandatory bump feed mode (or bump operational mode) in which the trigger switch TS is first actuated to generate the trigger signal and thereafter the contact trip assembly 21 is abutted against a workpiece so that the contact trip sensor/switch CTS generates the contact trip sensor signal.

Yet another mode of operation may be a combination mode that permits either sequential fire or bump feed wherein no particular sequence is required (i.e., the trigger sensor signal and the contact trip sensor signal may be made in either order or simultaneously).

The fastener tool 10 may also include a mode selector switch. The mode selector switch may be a switch that produces a mode selector switch signal that is indicative of a desired mode of operation of the fastener tool 10. The signals generated by the contact trip sensor/switch CTS, the mode selector switch, and the trigger switch TS are received and processed by the controller 38. As is generally known, one or more, or all, of the switches mentioned herein may be microswitches.

The controller 38 may be configured such that the fastener tool 10 will be operated in a given mode, such as the bump feed mode, only in response to the receipt of a specific signal from the mode selector switch. For example, the placement of the mode selector switch in a first position causes a signal of a predetermined first voltage to be applied to the controller 38, while the placement of the mode selector switch in a second position causes a signal of a predetermined second voltage to be applied to the controller 38. Limits may be placed on the voltage of one or both of the first and second voltages, such as ±a value or a percentage of voltage, so that if the voltage of one or both of the signals is outside the limits the controller 38 may default to a given feed mode (e.g., to the sequential feed mode) or operational condition (e.g., inoperative).

The fastener tool 10 may be configured to coordinate the feed cycle and the drive cycle. That is, the fastener tool 10 may be configured to coordinate the feed cycle and the drive cycle such that the driver 26 is less likely to encounter a jam scenario where the nails/fasteners are being fed into the space that is occupied by the driver blade portion of the driver 26, while the driver 26 is still going through its own motions.

For the sake of completeness, other features may be provided on the fastener tool 10. As shown in FIG. 1, for example, a stall release lever 140 may be provided on an outside of the housing 16 to address a stall condition or problem with regards to firing the fastener tool 10, e.g., a jam. The stall release lever 140 includes a lever arm 142, a spool, and a flange. The spool and the flange rotate with the lever arm. The stall release lever may be activated by a user/operator in an instance when a drive cycle is not completed. For example, when attempting to drive a nail into a hard material and insufficient power is available to fully sink the nail, the fastener tool 10 may stall or jam. Other cases for an incomplete drive cycle may include operational anomalies such as improper nail loading, non-conforming nails being used, or worn or broken components in the tool. In operation, when a stall or jam occurs, the operator may rotate the lever arm in a counterclockwise direction to release the load on the activation system, thereby moving the roller assembly 40 (as described in detail in the incorporated '404 Patent Application) away from the driver 26. Thus, the components in the fastener tool 10 are able to return to their respective home positions.

The present patent application and its various embodiments as described above uniquely address the observed, noted and researched findings and improve on the prior and current state of the art systems. The listed products, features and embodiments as described in the present patent application should not be considered as limiting in any way.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by a person of ordinary skill in the art in the context of the various elements, components, regions, layers and/or sections being described.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A fastener tool that drives a fastener into a workpiece comprising:

a housing;

a nose assembly connected with the housing, the nose assembly having a drive channel into which the fastener to be driven into the workpiece is fed, the drive channel having a drive axis;

a driver configured to be movable along the drive axis to engage and drive the fastener in the drive channel into the workpiece;

a motor disposed in the housing, the motor configured to be in either its energized state or its deenergized state;

a power supply;

a flywheel disposed in the housing, the flywheel configured to be driven by the motor and configured to transmit energy to the driver to cause the driver to move along the drive axis;

an actuator configured to move the driver into engagement with the flywheel such that energy is transferred from the flywheel to the driver; and a controller having one or more processors, the controller operatively connected to the motor and the actuator to implement a firing sequence for driving the fastener in the drive channel into the workpiece, wherein the controller is configured to:

i) control the actuator to initiate an engagement between the driver and the flywheel, and ii) control the motor to remain in its energized state while the flywheel is in the engagement with the driver to cause the movement of the driver along the drive axis, wherein the motor is controlled to be energized so that current draw from the power supply in a subsequent drive cycle does not reach zero.

2. The fastener tool of claim 1, wherein the actuator is a drive actuator; and wherein the drive actuator includes an electromechanical device.

3. The fastener tool of claim 1, wherein the actuator is a drive actuator, and wherein the drive actuator includes a drive solenoid.

4. The fastener tool of claim 3, further comprising a feed actuator and a feeder;

wherein the controller is operatively connected to the feed actuator to implement the firing sequence for driving a lead fastener into the workpiece using the driver and for feeding the lead fastener into the nose assembly using the feeder, wherein the feed actuator is configured to move the lead fastener into the nose assembly; and wherein the firing sequence includes a first electric pulse to the drive actuator and a second electric pulse to the feed actuator.

5. The fastener tool of claim 4, wherein the feed actuator includes a feed solenoid.

6. The fastener tool of claim 5, wherein the controller is configured to control the motor to continuously supply power to the flywheel during the firing sequence.

7. The fastener tool of claim 6, further comprising an arm and a roller, the arm being spring biased by a spring towards a first position, wherein the drive actuator is configured to press against the spring to move the arm into a second position such that the arm moves the roller to push the driver into engagement with the flywheel to cause the movement of the driver along the drive axis.

8. The fastener tool of claim 7, further comprising a biasing spring and a feed rod that is configured to move the lead fastener into the nose assembly, wherein the biasing spring is configured to bias the feed rod into a first position, and the feed actuator being configured to move the feed rod to a second position, against a biasing force of the biasing spring, for moving the lead fastener into the nose assembly.

9. The fastener tool of claim 8, further comprising a magazine coupled to the nose assembly and disposed in the housing, wherein the magazine is configured to carry a supply of fasteners through a feed channel along a feed channel direction toward the nose assembly, and wherein the feeder is operatively connected with the magazine and is configured to advance the fastener in a feed direction through the magazine and into the drive channel prior to driving the fastener into the workpiece.

10. The fastener tool according to claim 9, wherein the drive actuator is positioned on a first axis, wherein the feed actuator is positioned on a second axis, and wherein the first axis and the second axis are positioned at a non-perpendicular angle relative to one another.

11. The fastener tool according to claim 10, wherein the first axis is parallel to the drive axis, and wherein the second axis is parallel to the feed direction.

12. The fastener tool according to claim 11, wherein the drive axis of the drive actuator is provided in a first plane and an axis of the feed actuator defining the feed direction is provided in a second plane, wherein the first plane is different from the second plane.

13. The fastener tool of claim 4, wherein the feed actuator includes an electromechanical device.

14. The fastener tool of claim 1, wherein the controller is configured to control a supply of power from the power source to the motor to initiate a drive cycle, wherein the drive cycle includes a time from which the driver is activated to engage and drive the fastener in the drive channel into the workpiece to a time until the driver is retracted along the drive axis to clear the drive channel and to allow for feeding of a subsequent fastener into the drive channel.

15. The fastener tool of claim 1, wherein the firing sequence includes a drive event for driving a lead fastener into the workpiece using the driver, wherein the motor is configured to be energized for entirety of the drive event, and the motor is configured to be energized after the drive event, even after the actuator is de-energized and the driver has disengaged from the flywheel, and wherein, while the motor is still energized after the drive event, the driver is configured to reset to its home position to be ready for the next drive event.

16. A method for operating a fastener tool according to claim 1, the method comprising:

controlling the motor to be in its energized state before implementing the firing sequence and before controlling the actuator; and controlling the actuator to initiate the engagement between the flywheel and the driver to transmit energy from the flywheel to the driver so as to move the driver along the drive axis while the motor is still in its energized state.

17. A fastener tool that drives a fastener into a workpiece comprising:

a housing;

a nose assembly connected with the housing, the nose assembly having a drive channel into which the fastener to be driven into the workpiece is fed, the drive channel having a drive axis;

a motor disposed in the housing, the motor configured to be in either its energized state or its deenergized state;

a power supply;

a feeder configured to feed a lead fastener into the nose assembly;

a feed actuator configured to feed the lead fastener into the nose assembly;

a controller having one or more processors, the controller operatively connected to the motor and the feed actuator to implement a firing sequence for feeding the lead fastener into the nose assembly, wherein the controller is configured to:

i) control the feed actuator to initiate the firing sequence for feeding the lead fastener into the nose assembly using the feeder, and ii) control the motor to remain in its energized state while the feeder feeds the lead fastener into the nose assembly wherein the motor is controlled to be energized so that current draw from the power supply in a subsequent drive cycle does not reach zero.

18. The fastener tool of claim 17, wherein the feed actuator includes an electromechanical device.

19. The fastener tool of claim 17, wherein the feed actuator includes a feed solenoid.

20. The fastener tool of claim 17, further comprising a driver configured to be movable along the drive axis to engage and drive the fastener in the drive channel into the workpiece;

a flywheel disposed in the housing, the flywheel configured to be driven by the motor and configured to transmit energy to the driver to cause the driver to move along the drive axis; and a drive actuator configured to move the driver into engagement with the flywheel such that energy is transferred from the flywheel to the driver, wherein the controller operatively connected to the motor and the drive actuator to implement the firing sequence for driving the fastener in the drive channel into the workpiece, and wherein the firing sequence includes a first electric pulse to the drive actuator for driving the fastener in the drive channel into the workpiece and a second electric pulse to the feed actuator for feeding the lead fastener into the nose assembly.

* * * * *